(12) United States Patent
Inoue et al.

(10) Patent No.: US 7,774,641 B2
(45) Date of Patent: Aug. 10, 2010

(54) STORAGE SUBSYSTEM AND CONTROL METHOD THEREOF

(75) Inventors: Tetsuya Inoue, Odawara (JP); Hiroshi Suzuki, Sagamihara (JP); Tsutomu Koga, Matsuda (JP)

(73) Assignee: Hitachi, Ltd., Tokyo (JP)

( * ) Notice: Subject to any disclaimer, the term of this patent is extended or adjusted under 35 U.S.C. 154(b) by 351 days.

(21) Appl. No.: 12/100,569

(22) Filed: Apr. 10, 2008

(65) Prior Publication Data

US 2009/0204743 A1    Aug. 13, 2009

(30) Foreign Application Priority Data

Feb. 8, 2008   (JP) .............................. 2008-029561

(51) Int. Cl.
G06F 11/00    (2006.01)
(52) U.S. Cl. .............................................. 714/5; 714/7
(58) Field of Classification Search .................. 714/5–8
See application file for complete search history.

(56) References Cited

U.S. PATENT DOCUMENTS

| | | | | |
|---|---|---|---|---|
| 5,617,425 | A * | 4/1997 | Anderson | 714/710 |
| 7,127,633 | B1 * | 10/2006 | Olson et al. | 714/4 |
| 7,302,539 | B2 * | 11/2007 | Korgaonkar et al. | 711/162 |
| 7,596,723 | B2 * | 9/2009 | Elliott et al. | 714/43 |
| 2004/0049710 | A1 * | 3/2004 | Ashmore et al. | 714/5 |
| 2005/0188247 | A1 | 8/2005 | Abe et al. | |
| 2006/0048018 | A1 * | 3/2006 | Hosoya et al. | 714/48 |
| 2006/0106947 | A1 | 5/2006 | Benhase et al. | |
| 2006/0200696 | A1 * | 9/2006 | Shimada | 714/5 |
| 2007/0174719 | A1 | 7/2007 | Inoue et al. | |
| 2007/0180293 | A1 * | 8/2007 | Takahashi | 714/6 |
| 2010/0115143 | A1 * | 5/2010 | Nakajima | 710/5 |

FOREIGN PATENT DOCUMENTS

EP    1637996 A2    3/2006
JP    2007-141185    6/2007

* cited by examiner

Primary Examiner—Bryce P Bonzo
(74) Attorney, Agent, or Firm—Brundidge & Stanger, P.C.

(57) ABSTRACT

Provided is a storage subsystem capable of inhibiting the deterioration in system performance to a minimum while improving reliability and availability. This storage subsystem includes a first controller for controlling multiple drive units connected via multiple first switch devices, and a second controller for controlling the multiple drive units connected via multiple second switch devices associated with the multiple first switch devices. This storage subsystem also includes a connection path that mutually connects the multiple first switch devices and the corresponding multiple second switch devices. When the storage [sub]system detects the occurrence of a failure, it identifies the fault site in the connection path, and changes the connection configuration of the switch device so as to circumvent the fault site.

14 Claims, 26 Drawing Sheets

ERROR PATTERN TABLE 400

| ERROR PATTERN | ERROR COUNTER VALUE | THRESHOLD VALUE |
|---|---|---|
| 0 0 0 0 0 0 0 0 | 0 | 5 |
| 0 1 0 1 0 1 0 1 | 2 | 10 |
| 1 0 1 0 1 0 1 0 | 0 | 10 |
| 1 1 1 1 0 0 0 0 | 1 | 20 |
| 0 0 0 0 1 1 1 1 | 1 | 20 |

FIG. 6

CONNECTION PATH MAP 600

| SWITCH DEVICE NAME (601) | Port_No (602) | DESTINATION DEVICE NAME (603) | STATUS (604) |
|---|---|---|---|
| Switch-11 | #1 | DKA-1 | Enabled |
|  | #2 | HDD #1 | Enabled |
|  | #3 | HDD #2 | Enabled |
|  | #4 | Switch-12 | Enabled |
|  | #5 | – | Disabled |
| Switch-12 | #1 | Switch-11 | Enabled |
|  | #2 | HDD #3 | Enabled |
|  | #3 | HDD #4 | Enabled |
|  | #4 | Switch-13 | Enabled |
|  | #5 | – | Disabled |
| Switch-13 | #1 | Switch-14 | Enabled |
|  | #2 | HDD #5 | Enabled |
|  | #3 | HDD #6 | Enabled |
|  | #4 | Switch-12 | Enabled |
|  | #5 | – | Disabled |
| Switch-14 | #1 | Switch-13 | Enabled |
|  | #2 | HDD #7 | Enabled |
|  | #3 | HDD #8 | Enabled |
|  | #4 | – | Disabled |
|  | #5 | – | Disabled |

CONNECTION PATH MAP 600

FIG. 8

CONNECTION PATH RESTRUCTURING PATTERN 800

| FAILURE PATTERN | | | | | | CONNECTION PATH RESTRUCTURING PATTERN | | | | | | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|---|---|---|---|---|---|---|---|---|---|---|
| | Switch-1(n) | | | | | Switch-1(n-1) | | | | | Switch-1(n) | | | | | Switch-1(n+1) | | | | | Switch-2(n-1) | | | | | Switch-2(n) | | | | | Switch-2(n+1) | | | | |
| | #1 | #2 | #3 | #4 | #5 | #1 | #2 | #3 | #4 | #5 | #1 | #2 | #3 | #4 | #5 | #1 | #2 | #3 | #4 | #5 | #1 | #2 | #3 | #4 | #5 | #1 | #2 | #3 | #4 | #5 | #1 | #2 | #3 | #4 | #5 |
| 1: | F | | | E | | D | | | E | E | D | | | E | E | E | | | E | — | E | | | E | E | E | | | E | — | E | | | E | — |
| 2: | F | | | E | F | D | | | E | E | E | | | E | D | E | | | E | E | E | | | E | E | E | | | E | E | E | | | E | E |
| 3: | E | | | E | | E | | | E | — | E | | | E | E | E | | | E | E | E | | | E | — | E | | | E | — | E | | | E | E |
| 4: | E | | | F | F | D | | | E | E | D | | | E | D | E | | | E | E | E | | | E | E | E | | | E | D | E | | | E | E |
| 5: | F | | | F | | D | | | E | E | D | | | E | D | E | | | E | E | E | | | E | E | E | | | E | D | E | | | E | E |
| 6: | F | | | F | F | D | | | E | E | D | | | E | D | E | | | E | E | E | | | E | E | E | | | E | E | E | | | E | E |

801 ← FAILURE PATTERN

802 ← CONNECTION PATH RESTRUCTURING PATTERN

CONNECTION PATH IN NORMAL STATUS

FAILURE OF PORT #1 OF SWITCH-12

FIG. 15

| Switch SWITCH DEVICE NAME | Port_No | DESTINATION DEVICE NAME | STATUS |
|---|---|---|---|
| Switch-11 | #1 | DKA-1 | Enabled |
| | #2 | HDD #1 | Enabled |
| | #3 | HDD #2 | Enabled |
| | #4 | - | Disabled |
| | #5 | Switch-21 | Enabled |
| Switch-12 | #1 | Switch-11 | Enabled |
| | #2 | HDD #3 | Enabled |
| | #3 | HDD #4 | Enabled |
| | #4 | - | Disabled |
| | #5 | Switch-21 | Enabled |
| Switch-13 | #1 | Switch-14 | Enabled |
| | #2 | HDD #5 | Enabled |
| | #3 | HDD #6 | Enabled |
| | #4 | Switch-12 | Enabled |
| | #5 | - | Disabled |
| Switch-14 | #1 | Switch-13 | Enabled |
| | #2 | HDD #7 | Enabled |
| | #3 | HDD #8 | Enabled |
| | #4 | - | Disabled |
| | #5 | - | Disabled |
| Switch-21 | #1 | DKA-2 | Enabled |
| | #2 | HDD #1 | Enabled |
| | #3 | HDD #2 | Enabled |
| | #4 | Switch-22 | Enabled |
| | #5 | Switch-11 | Enabled |
| Switch-22 | #1 | Switch-21 | Enabled |
| | #2 | HDD #3 | Enabled |
| | #3 | HDD #4 | Enabled |
| | #4 | Switch-23 | Enabled |
| | #5 | Switch-12 | Enabled |
| Switch-23 | #1 | Switch-22 | Enabled |
| | #2 | HDD #5 | Enabled |
| | #3 | HDD #6 | Enabled |
| | #4 | Switch-24 | Enabled |
| | #5 | - | Disabled |
| Switch-24 | #1 | Switch-23 | Enabled |
| | #2 | HDD #7 | Enabled |
| | #3 | HDD #8 | Enabled |
| | #4 | - | Disabled |
| | #5 | - | Disabled |

FIG. 16

| Switch | | DESTINATION DEVICE NAME | STATUS |
|---|---|---|---|
| SWITCH DEVICE NAME | Port_No | | |
| Switch-21 | #1 | DKA-2 | Enabled |
| | #2 | HDD #1 | Enabled |
| | #3 | HDD #2 | Enabled |
| | #4 | Switch-22 | Enabled |
| | #5 | Switch-11 | Enabled |
| Switch-22 | #1 | Switch-21 | Enabled |
| | #2 | HDD #3 | Enabled |
| | #3 | HDD #4 | Enabled |
| | #4 | Switch-23 | Enabled |
| | #5 | Switch-12 | Enabled |
| Switch-23 | #1 | Switch-22 | Enabled |
| | #2 | HDD #5 | Enabled |
| | #3 | HDD #6 | Enabled |
| | #4 | Switch-24 | Enabled |
| | #5 | - | Disabled |
| Switch-24 | #1 | Switch-23 | Enabled |
| | #2 | HDD #7 | Enabled |
| | #3 | HDD #8 | Enabled |
| | #4 | - | Disabled |
| | #5 | - | Disabled |
| Switch-11 | #1 | DKA-1 | Enabled |
| | #2 | HDD #1 | Enabled |
| | #3 | HDD #2 | Enabled |
| | #4 | - | Disabled |
| | #5 | Switch-21 | Enabled |
| Switch-12 | #1 | Switch-11 | Enabled |
| | #2 | HDD #3 | Enabled |
| | #3 | HDD #4 | Enabled |
| | #4 | - | Disabled |
| | #5 | Switch-21 | Enabled |
| Switch-13 | #1 | Switch-14 | Enabled |
| | #2 | HDD #5 | Enabled |
| | #3 | HDD #6 | Enabled |
| | #4 | Switch-12 | Enabled |
| | #5 | - | Disabled |
| Switch-14 | #1 | Switch-13 | Enabled |
| | #2 | HDD #7 | Enabled |
| | #3 | HDD #8 | Enabled |
| | #4 | - | Disabled |
| | #5 | - | Disabled |

FAILURE OF PORTS #1 AND #5 OF SWITCH-12

FAILURE OF PORT #4 OF SWITCH-12

FAILURE OF PORTS #4 AND #5 OF SWITCH-12

FAILURE OF PORTS #1 AND #4 OF SWITCH-12

FAILURE OF PORTS #1, #4 AND #5 OF SWITCH-12

FAILURE OF PORT #1 OF SWITCH-12

STORAGE SUBSYSTEM AND CONTROL METHOD THEREOF

CROSS-REFERENCES

This application relates to and claims priority from Japanese Patent Application No. 2008-029561, filed on Feb. 8, 2008, the entire disclosure of which is incorporated herein by reference.

BACKGROUND

The present invention relates in general to a storage subsystem and its control method, and relates in particular to a storage subsystem adopting a redundant path configuration and which includes a connection path formed from a plurality of switch devices, and a control method of such a connection path.

A storage subsystem is an apparatus adapted for providing a data storage service to a host computer. A storage subsystem is typically equipped with a plurality of hard disk drives for storing data and a disk controller for controlling the plurality of hard disk drives. A disk controller includes a processor for controlling the overall storage subsystem, a frontend interface for connecting to a host computer, and a backend interface for connecting to a plurality of hard disk drives. Typically, a cache memory for caching user data is arranged between the interfaces of the host computer and the plurality of hard disk drives. The plurality of hard disk drives is arranged in array via switch circuits arranged in multiple stages.

Since a storage subsystem is generally used in mission critical business activities, it is demanded of high reliability and high availability. Thus, in view of fault tolerance, components in the storage subsystem are typically configured redundantly. For example, the path for accessing the hard disk drive is made redundant in the backend interface so that, even if one of the paths is subject to a failure, the other path can be used to operate the system without interruption. Moreover, if a failure occurs in the storage subsystem, the component subject to such failure is identified immediately and failure recovery is performed.

Japanese Patent Laid-Open Publication No. 2007-141185 discloses a storage controller that monitors a plurality of ports of a switch circuit connected to a disk drive, identifies the fault site with a failure recovery control unit provided to the controller upon detecting an error in any one of the ports, and thereby performs failure recovery processing.

SUMMARY

Since a storage subsystem is generally used in mission critical business activities, it is demanded of high reliability and high availability. Failure of components configuring the storage subsystem will stochastically occur, and it is not possible to avoid such a failure. Thus, it is necessary to give sufficient consideration to fault tolerance from the perspective of system design.

For example, as described above, even if a failure occurs in one of the redundant paths, the storage subsystem can operate the system without interruption by accessing the hard disk drive via the other remaining path, and thereby withstand failure.

Nevertheless, with this kind of conventional storage subsystem, since the redundant paths are respectively configured independently across the board, once a failure occurs, there is a problem in that the path itself that was subject to the failure cannot be used, and the influence of the failure will become widespread.

Further, since the system is operated with only the other path while failure recovery is being performed, the system will not be able to deal with any additional failure. Thus, in the event of occurrence of a failure in the remaining path, there is a problem in that the system will crash.

In addition, if the system is operated with only the other path, since the access load will be concentrated on such other path, there is a problem in that the throughput performance will deteriorate.

Considering the foregoing problems, an object of the present invention is to provide a storage subsystem and its control method capable of inhibiting the deterioration in the system performance to a minimum while improving the reliability and availability of the storage subsystem.

More specifically, one object of the present invention is to provide a storage subsystem and its control method capable of inhibiting the influence of failure to a minimum even when a failure occurs in the storage subsystem.

Another object of the present invention is to provide a storage subsystem and its control method capable of preventing the deterioration in throughput performance, even if a failure occurs in the storage subsystem, by performing load balancing while maintaining a redundant configuration as much as possible with components that are not subject to a failure until [the system] recovers from the failure.

These and other objects of the invention will become more readily apparent from the ensuing specification when taken in conjunction with the appended claims.

The present invention is devised to achieve the foregoing objects, and the gist of the storage subsystem according to this invention is, upon detecting a fault site in a connection path to a drive unit, to restructure the connection path so as to circumvent or avoid the fault site.

Specifically, one aspect of the present invention provides a storage subsystem including a first controller and configured to control a plurality of drive units connected via a plurality of first switch devices and a second controller configured to control a plurality of drive units connected via a plurality of second switch devices associated with the plurality of first switch devices. This storage subsystem also includes a connection path that mutually connects the plurality of first switch devices and the corresponding plurality of second switch devices. When the storage subsystem detects the occurrence of a failure, it identifies the fault site in the connection path, and changes the connection configuration of the switch device so as to circumvent the fault site.

By way of this, even if a failure occurs internally, the storage subsystem can inhibit the influence of the failure to a minimum. In addition, even if this kind of failure occurs, the storage subsystem can maintain a redundant configuration as much as possible with the components not subject to a failure until the subsystem recovers from the failure. Thus, the subsystem can perform load balancing and prevent deterioration of the throughput performance.

Further, another aspect of the present invention provides a storage subsystem comprising a plurality of drive units including a storage medium for storing data, a plurality of first switch devices including a plurality of ports and connecting at least one of the plurality of drive units to at least one of the plurality of ports therein, a first disk controller for connecting at least one of the plurality of first switch devices and configured to control the plurality of drive units, a plurality of second switch devices including a plurality of ports and connecting at least one of the plurality of drive units to at least one of the plurality of ports therein, wherein each of the plurality of second switch devices corresponds to each of the plurality of first switches, and a second disk controller connected to at least one of the plurality of second switch devices and controlling the plurality of drive units. This storage subsystem is configured such that at least one of the plurality of ports in each of the plurality of first switch devices and at least one of the plurality of ports in each of the corresponding plurality of second switch devices are interconnected.

Moreover, another aspect of the present invention provides a storage subsystem comprising a plurality of first drive units including a storage medium for storing data, a plurality of second drive units including a storage medium for storing data, a plurality of first switch devices including a plurality of ports and connecting at least one of the plurality of first drive units to at least one of the plurality of ports therein, a plurality of second switch devices including a plurality of ports and connecting at least one of the plurality of first drive units to at least one of the plurality of ports therein, wherein each of the plurality of second switch devices corresponds to each of the plurality of first switches, a plurality of third switch devices including a plurality of ports and connecting at least one of the plurality of second drive units to at least one of the plurality of ports therein, a plurality of fourth switch devices including a plurality of ports and connecting at least one of the plurality of second drive units to at least one of the plurality of ports therein, a first disk controller connected to at least one of the plurality of first switch devices and configured to control the plurality of first drive units, and connecting at least one of the plurality of third switch devices and configured to control the plurality of second drive units, and a second disk controller connecting at least one of the plurality of second switch devices and configured to control the plurality of first drive units, and connecting at least one of the plurality of fourth switch devices and configured to control the plurality of second drive units. This storage subsystem is configured such that at least one of the plurality of ports in each of the plurality of first switch devices and at least one of the plurality of ports in each of the corresponding plurality of second switch devices are connected, and at least one of the plurality of ports in each of the plurality of third switch devices and at least one of the plurality of ports in each of the corresponding plurality of fourth switch devices are connected.

Further, another aspect of the present invention can be also be comprehended to be a process invention. Specifically, the present invention provides a control method of an inter-switch device connection path in a storage subsystem including a first controller configured to control a plurality of drive units connected via a plurality of first switch devices in cascade connection, and a second controller configured to control the plurality of drive units connected via a plurality of second switch devices in cascade connection and associated with the plurality of first switch devices. This control method comprises a step of at least either the first disk controller or the second disk controller sending a data frame based on a command for accessing at least one of the plurality of drive units via the plurality of switch devices connected to itself, a step of at least one disk controller receiving the data frame sent via the plurality of switch devices in reply to the command, and checking an error in the received data frame, a step of at least one disk controller sending an error information send request to the plurality of switch devices upon detecting an error in the data frame as a result of the check, a step of at least one disk controller receiving error information sent in reply to the error information send request, a step of at least one disk controller identifying the switch device and port of the switch device in which an error has been detected as a fault site based on the received error information, and a step of at least one disk controller changing the inter-switch device connection path based on the identified fault site and according to a prescribed connection path restructuring pattern.

According to the present invention, the storage subsystem can inhibit the deterioration in system performance to a minimum while improving its reliability and availability.

The above and other objects, features and advantages of the present invention will be more apparent from the following detailed description taken in conjunction with the accompanying drawings.

DESCRIPTION OF DRAWINGS

FIG. 6 is a diagram showing an example of a connection path map retained by the disk controller according to an embodiment of the present invention;

FIG. 8 is a diagram showing an example of a connection path restructuring table retained by the disk controller according to an embodiment of the present invention;

FIG. 15 is a diagram showing an example of the connection path map retained by the disk controller according to an embodiment of the present invention;

FIG. 16 is a diagram showing an example of the connection path map retained by the disk controller according to an embodiment of the present invention;

DETAILED DESCRIPTION

Embodiments of the present invention are now explained with reference to the attached drawings.

First Embodiment

Figure 1:
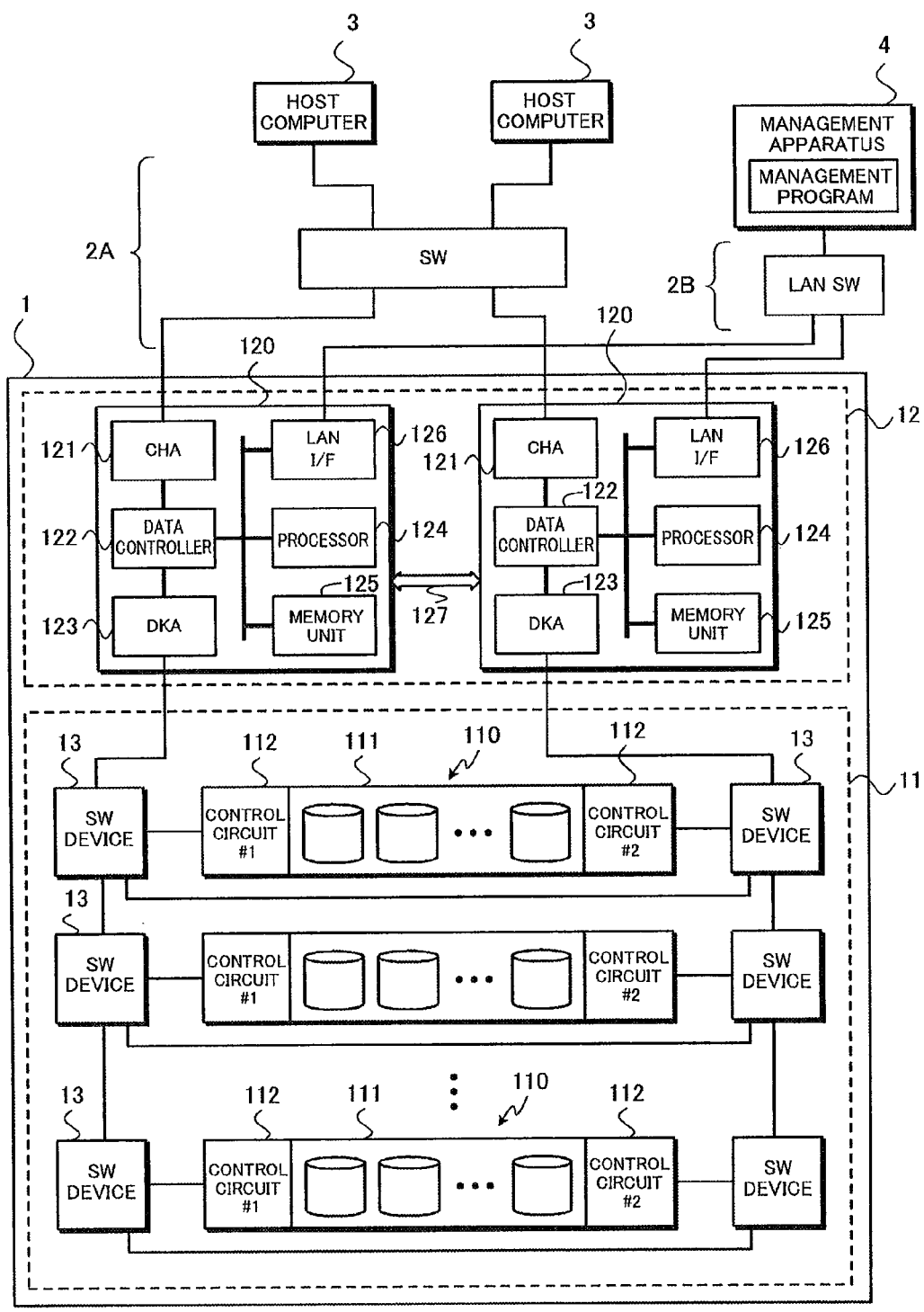
FIG. 1 is a block diagram illustrating the overall configuration of a storage subsystem according to an embodiment of the present invention.

FIG. 1 is a block diagram illustrating the overall configuration of a storage subsystem according to an embodiment of the present invention. The storage subsystem 1 shown in FIG. 1 is connected to a host computer 3 via a network 2A, thereby forming a computer system. The storage subsystem 1 is also connected to a management apparatus 4 via a management network 2B.

The network 2A can be, for example, a LAN, Internet, or a SAN (Storage Area Network), and is typically configured including network switches or hubs. In this embodiment, the network 2A is configured with a SAN (FC-SAN) using a fibre channel protocol, and the management network 2B is configured with a LAN.

The host computer 3 comprises hardware resources such as a processor, a main memory, a communication interface, and a local I/O device, as well as software resources such as a device driver, an operating system (OS), and an application program (not shown). The host computer 3 thereby achieves desired processing, by way of executing the various application programs under the control of the processor in cooperation with the other hardware resources while accessing the storage subsystem 1.

The storage subsystem 1 is an auxiliary storage apparatus that provides data storage services to the host computer 3. The storage subsystem 1 comprises a storage device 11 including a storage medium for storing data, and a disk controller 12 for controlling the storage device 11. The storage device 11 and the disk controller 12 are interconnected via a disk channel. The internal configuration of the disk controller 12 is made redundant, and the disk controller 12 can access the storage device 11 using two channels (connection paths).

The storage device 11 is configured by including one or more drive units 110. The drive unit 110 is configured from, for example, a hard disk drive 111 and a control circuit 112 for controlling the drive of the hard disk drive 111. The hard disk drive 111 is fitted into and mounted on the drive unit 110. In substitute for the hard disk drive 111, a solid state drive such as a flash memory may also be used. The control circuit 112 is also made redundant in correspondence with the redundant path configuration in the disk controller 12.

Typically, the drive unit 110 is connected to the disk controller 12 via a switch device (or expander) 13. As a result of using a plurality of switch devices 13, a plurality of drive units 110 can be connected in various modes. In this embodiment, a drive unit 110 is connected to each of the plurality of switch devices 13 in cascade connection. In other words, the disk controller 120 accesses the drive units 110 via the plurality of cascade-connected switch devices 13 under its control. Thus, a drive unit 110 can be easily added on by additionally cascade-connecting a switch device 13, and the storage capacity of the storage subsystem 1 can be easily expanded. The topology of the drive units 110 in the storage subsystem 1 is defined based on the connection map described later.

The hard disk drives 111 of the drive unit 110 typically configure a RAID group based on a prescribed RAID configuration (e.g., RAID 5), and is accessed under RAID control. RAID control is performed with a RAID controller (not shown) implemented in the disk controller 12. The RAID group may be configured across some of drive units 110. The hard disk drives 111 belonging to the same RAID group are recognized as a single virtual logical device by the host computer 3.

The disk controller 12 is a system component for controlling the overall storage subsystem 1, and its primary role is to execute I/O processing to the storage device 11 based on an access request from the host computer 3. The disk controller 12 also executes processing related to the management of the storage subsystem 1 based on various requests from the management apparatus 4.

As described above, in this embodiment, the components in the disk controller 12 are made redundant from the perspective of fault tolerance. In the ensuing explanation, each of the redundant disk controllers 12 is referred to as a "disk controller 120," and, when referring to the disk controllers 120 separately, the disk controllers will be referred to as a "first disk controller 120" and a "second disk controller 120."

Each disk controller 120 includes a channel adapter 121, a data controller 122, a disk adapter 123, a processor 124, a memory unit 125, and a LAN interface 126. The both disk controllers 120 are connected via a bus 127 so as to be mutually communicable.

The channel adapter (CHA) 121 is an interface for connecting the host computer 3 via the network 2A, and controls the data communication according to a predetermined protocol with the host computer 3. When the channel adapter 121 receives a write command from the host computer 3, it writes the write command and the corresponding data in the memory unit 125 via the data controller 122. The channel adapter 121 may also be referred to as a host interface or a frontend interface.

The data controller 122 is an interface among the components in the disk controller 120, and controls the sending and receiving of data among the components.

The disk adapter (DKA) 123 is an interface for connecting the drive unit 110, and controls the data communication according to a predetermined protocol with the drive unit 110 based on an I/O command from the host computer 3. In other words, when the disk adapter 123 periodically checks the memory unit 125 and discovers an I/O command in the memory unit 125, it accesses the drive unit 110 according to that command.

More specifically, if the disk adapter 123 finds a write command in the memory unit 125, it accesses the storage device 11 in order to destage the data in the memory unit 125 designated by the write command to the storage device 11 (i.e., a prescribed storage area of the hard disk drive 111). Further, if the disk adapter 123 finds a read command in the memory unit 125, it accesses the storage device 11 in order to stage the data in the storage device 11 designated by the read command to the memory unit 125.

The disk adapter 123 of this embodiment is equipped with a failure recovery function in addition to the foregoing I/O function. These functions may be implemented as firmware.

The disk adapter 123 may also be referred to as a disk interface or a backend interface.

The processor 124 governs the operation of the overall disk controller 120 (i.e., the storage subsystem 1) by way of executing various control programs loaded in the memory unit 125. The processor 124 may be a multi-core processor.

Figure 2:
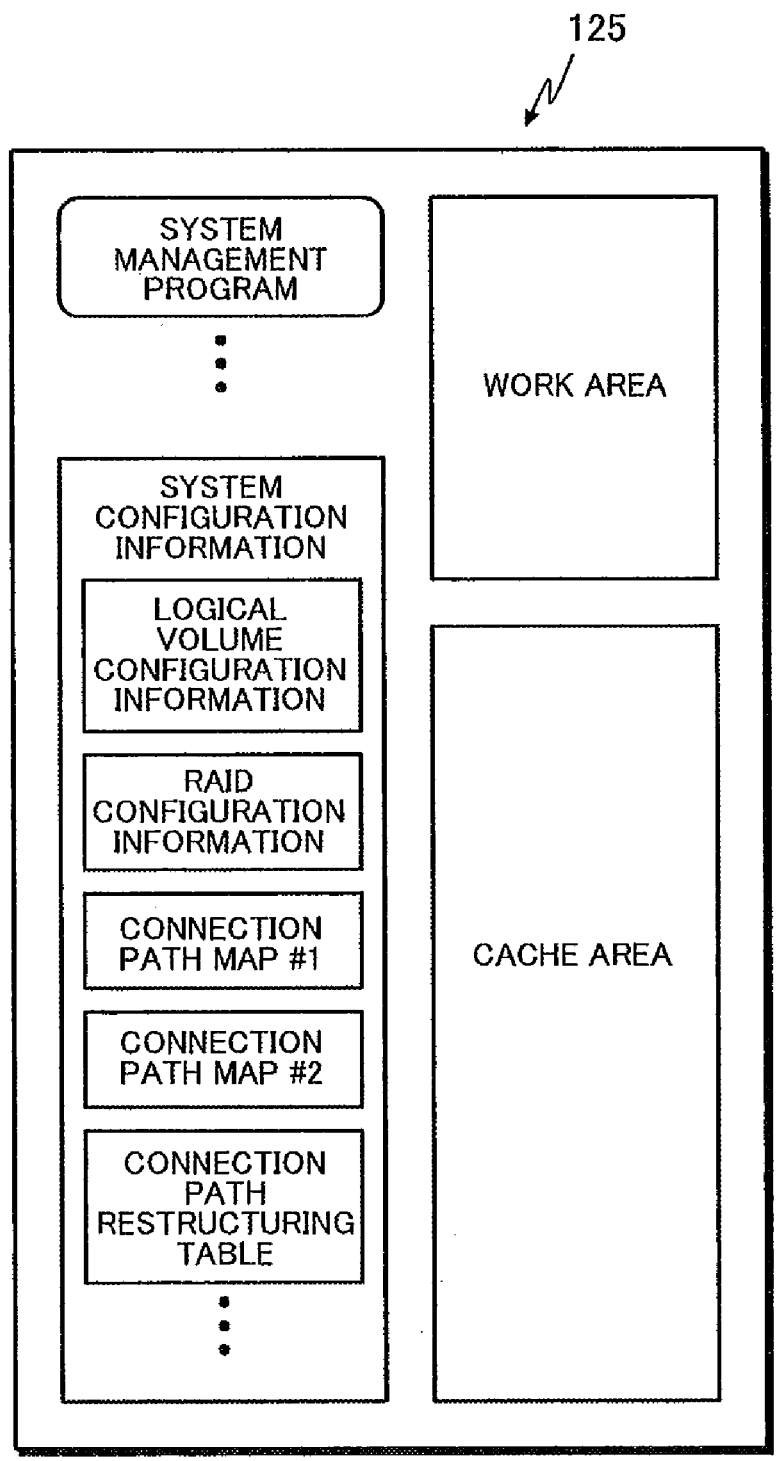
FIG. 2 is a block diagram showing an example of the contents of a memory unit in a disk controller according to an embodiment of the present invention.

The memory unit 125 serves as the main memory of the processor 124, and also serves as the cache memory of the channel adapter 121 and the disk adapter 123. The memory unit 125 may be configured from a volatile memory such as a DRAM, or a non-volatile memory such as a flash memory. The memory unit 125, as shown in FIG. 2, stores the system configuration information of the storage subsystem 1 itself. The system configuration information includes logical volume configuration information, RAID configuration information, a connection path map, a connection path restructuring table, and the like. The system configuration information is read from a specified storage area of the hard disk drive 11 according to the initial process under the control of the processor 124 when the power of the storage subsystem 1 is turned on. The connection path map and the connection path restructuring table will be described later.

The LAN interface 126 is an interface circuit for connecting the management apparatus 4 via the LAN. As the LAN interface, for example, a network board according to TCP/IP and Ethernet (registered trademark) can be used.

The management apparatus 4 is an apparatus that is used by the system administrator to manage the overall storage subsystem 1, and is typically configured from a general purpose computer installing a management program. The management apparatus 4 may also be referred to as a service processor. In FIG. 1, although the management apparatus 4 is provided outside the storage subsystem 1 via the management network 2B, the configuration is not limited thereto, and it may also be provided inside the storage subsystem 1. Alternatively, the disk controller 120 may be configured to include functions that are equivalent to the management apparatus 4.

By way of issuing commands to the disk controller via the user interface provided by the management apparatus 4, the system administrator can acquire and refer to the system configuration information of the storage subsystem 1, as well as setting and editing the system configuration information. For example, the system administrator can operate the management apparatus 4 and set the logical volume or virtual volume, or set the RAID configuration in conjunction with adding on hard disk drives.

Figure 3:
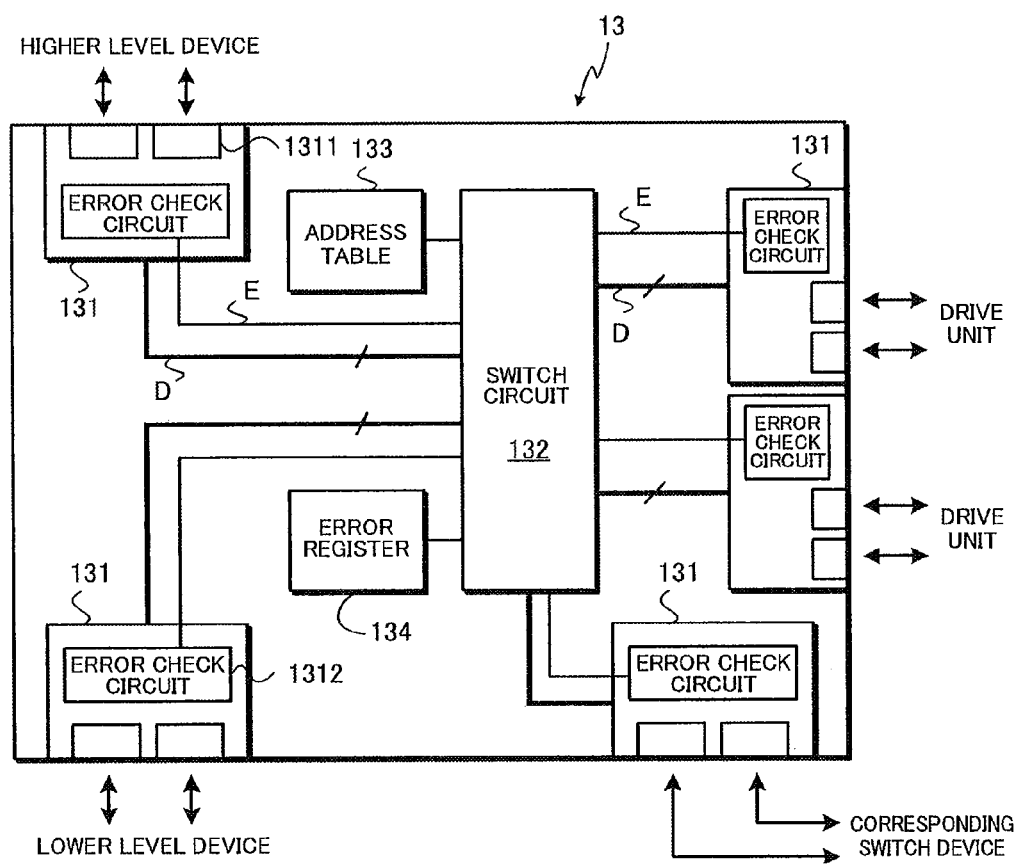
FIG. 3 is a block diagram explaining the configuration of a switch device of the storage subsystem according to an embodiment of the present invention.

FIG. 3 is a block diagram illustrating the configuration of the switch device 13 in the storage subsystem 1 according to an embodiment of the present invention.

As shown in FIG. 3, the switch device 13 comprises a plurality of port units 131, a switch circuit 132, an address table 133, and an error register 134.

The port unit 131 includes a plurality of ports 1311 for external connection, and an error check circuit 1312. Although not shown, the port unit 131 includes a buffer, and can temporarily store incoming data frames and outgoing data frames. Connected to the ports 1311 are, for example, the disk controller 120, another switch device 13, and the drive unit 110. Each port 1311 is allocated with a unit number (port number) in the switch device 13 for identifying the respective ports. The port number may be allocated to each port unit 131. Although FIG. 3 shows a case where a plurality of port units 131 are arranged and respectively connected to other devices, the configuration is not limited thereto, and the devices may be respectively connected to a plurality of ports 1311 provided to a single port unit 131.

Inside the switch device 13, each port 1311 is connected to the switch circuit 132 via a data line D. The error check circuit 1312 monitors the communication error in each port 1311 according to an error pattern table shown in FIG. 4. Specifically, the error check circuit 1312 checks the parity contained in the data frame that passes through each port 1311, and increments the value of the error counter of a prescribed error pattern when the parity coincides with that error pattern. The error check circuit 1312 outputs error information to an error signal line E when the value of the error counter exceeds a prescribed threshold value. The error information is written into the error signal line E via the switch circuit 132.

The switch circuit 132 includes switching elements each configured from an address latch and a selector. The switch circuit 132 analyzes header of the incoming data frame and thereby switches the destination of the data frame according to the address table 133.

The error register 134 is a register for retaining the error information sent from the error check circuit 1312 of the respective port units 131.

Figure 4:
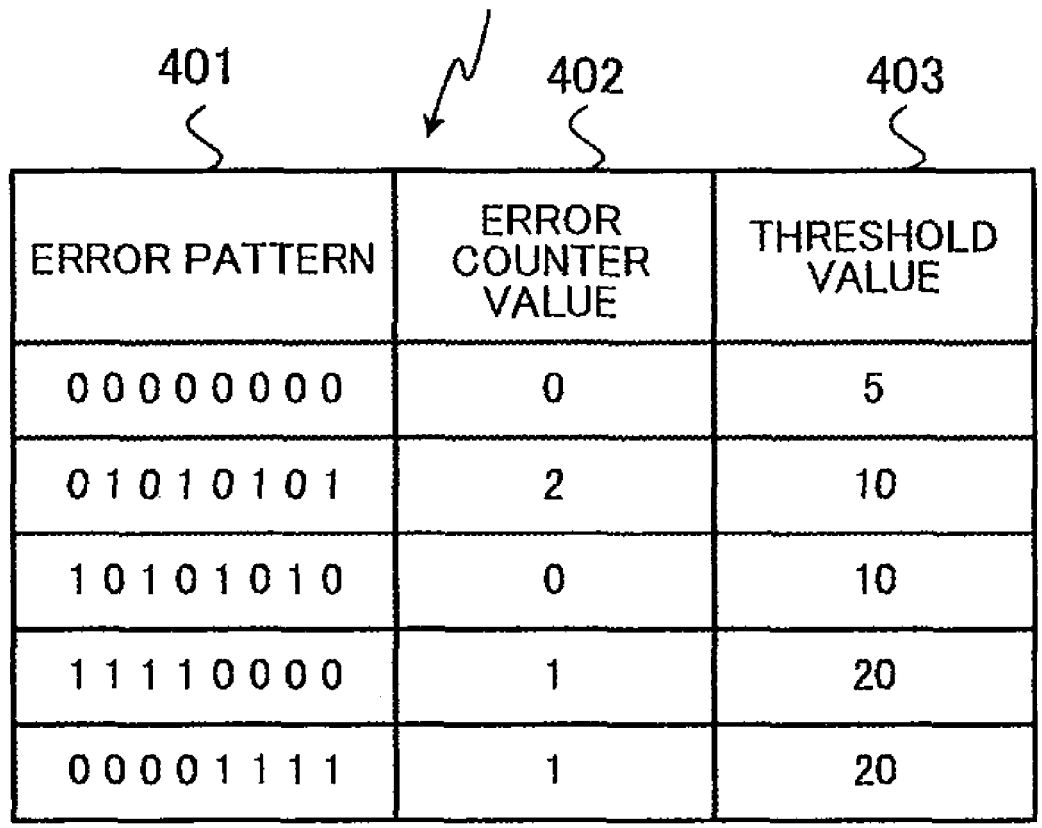
FIG. 4 is a diagram showing an example of an error pattern table of the switch device according to an embodiment of the present invention.

FIG. 4 shows an example of the error pattern table in the switch device 13 according to an embodiment of the present invention. The error pattern table is retained in the error check circuit 1312.

In the error pattern table 400, as shown in FIG. 4, the error counter value 402 and a prescribed threshold value 403 are associated with each error pattern 401 defined in a prescribed bit sequence. The error pattern 401 is a bit pattern that will not appear in the parity in the data frame during normal data communication. The error counter value 402 is the number of errors that occurred in each error pattern 401, and the threshold value 403 is the tolerable upper limit of the error count.

If the parity in the data frame coincides with any one of the error patterns 401, the error check circuit 1312 determines this to be an occurrence of an error and increments the error counter value 402 of the detected error pattern 401. The error check circuit 1312 additionally compares the error counter value 402 and the threshold value 403, and outputs error information to the error signal line E when it determines that the error counter value 402 exceeded the threshold value 403.

Figure 5:
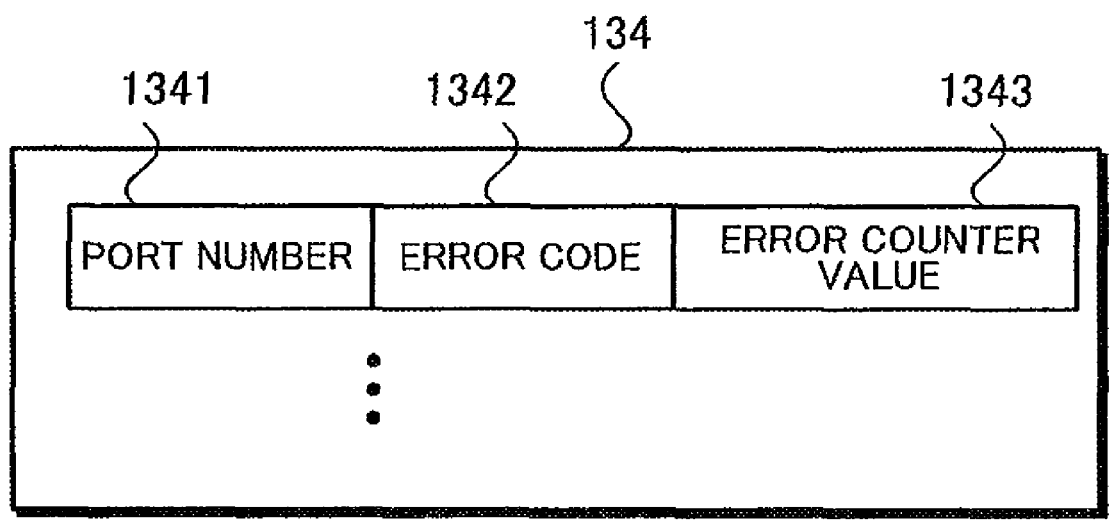
FIG. 5 is a diagram explaining the contents of an error register of the switch device according to an embodiment of the present invention.

FIG. 5 illustrates the contents of the error register 134 in the switch device 13 according to an embodiment of the present invention.

As shown in FIG. 5, the error register 134 stores the error information sent from the error check circuit 1312. The error information includes, for example, a port number 1341, an error code 1342, and an error counter value 1343. The port number 1341 is the port number of the port 1311 in which an error was detected. The error code 1342, for example, is a code allocated to each error pattern 401, and the content of the error can be recognized by referring to the error code 1342. The error information of the error register 134 is read out in reply to an error information send request sent from an external device (for instance, the channel adapter 123).

Figure 7:
FIG. 7 is a diagram showing an example of a connection path map retained by the disk controller according to an embodiment of the present invention.

FIG. 6 and FIG. 7 are show an example of the connection path map 600 stored in the memory unit 125 of the disk controller 120 according to an embodiment of the present invention. The connection path map 600 is stored in the memory unit 125 of each redundant disk controller 120. FIG. 6 shows the connection path map 600 in the first disk controller 120, and FIG. 7 shows the connection map 600 in the second disk controller 120. The disk controller 120 refers to the connection path map 600 of another disk controller 120 via the bus 127.

The connection path map 600 is a table showing the devices connected to each port 1311 of each switch device 13, and the status of the relevant port 1311. Specifically, the connection path map 600 includes a device name 601, a port number 602, a destination device name 603, and a status 604. The device name 601 is the identification name allocated uniquely to the switch device 13. The port number 602 is the port number of the port 1311 provided to the switch device 13. The destination device name 603 is the identification name allocated for uniquely identifying the device connected to the port 1311. The status 604 shows whether the port 1311 is of an enabled status (enabled) or a disabled status (disabled).

For example, as shown in FIG. 6, the switch device 13 indicated with the device name "Switch-11" is connecting the first disk controller 120 indicated with the destination device name "Controller-1" to the port indicated with port number "#1." Here, the status of this port is "Enabled." Similarly, "HDD #1" and "HDD #2" are respectively connected to ports "#2" and "#3" of "Switch-11," and "Switch-12" is connected to port "#4." Nothing is connected to port "#5," and the status of this port is "Disabled."

FIG. 8 shows an example of the connection path restructuring table 800 retained in the memory unit 125 of the disk controller 120 according to an embodiment of the present invention. The connection path restructuring table 800 is stored in the memory unit 125 of each redundant disk controller 120.

Specifically, as shown in FIG. 8, the connection path restructuring table 800 is configured from a failure pattern 801 and a connection path restructuring pattern 802. The failure pattern 801 is a combination of the fault sites where an error was detected. The fault site is the port 1311 of the switch device 13 in which an error was detected. In this example, the failure pattern 801 defines six patterns according to the combination of the ports 1311. In FIG. 8, "F" indicates that the port 1311 of that port number is a fault site, and "E" indicates that the port 1311 of that port number is of an enabled status (in use). An empty column indicates that the status of enabled or disabled is not considered, and "–" indicates that the status remains the same. For example, the failure pattern 801 shown in the first line shows that an error has been detected in port number #1 while port numbers #1 and #4 are being in use.

The connection path restructuring pattern 802 defines the status of the port 1311 of each switch device 13 required for restructuring the connection path in order to circumvent the fault site. In FIG. 8, the portion illustrated with the hatching shows that the status of the port 1311 is required to be changed for restructuring the connection path.

The restructure processing of the connection path using the connection path restructuring table 800 will be explained in detail with reference to FIG. 13 to FIG. 21.

Figure 9:
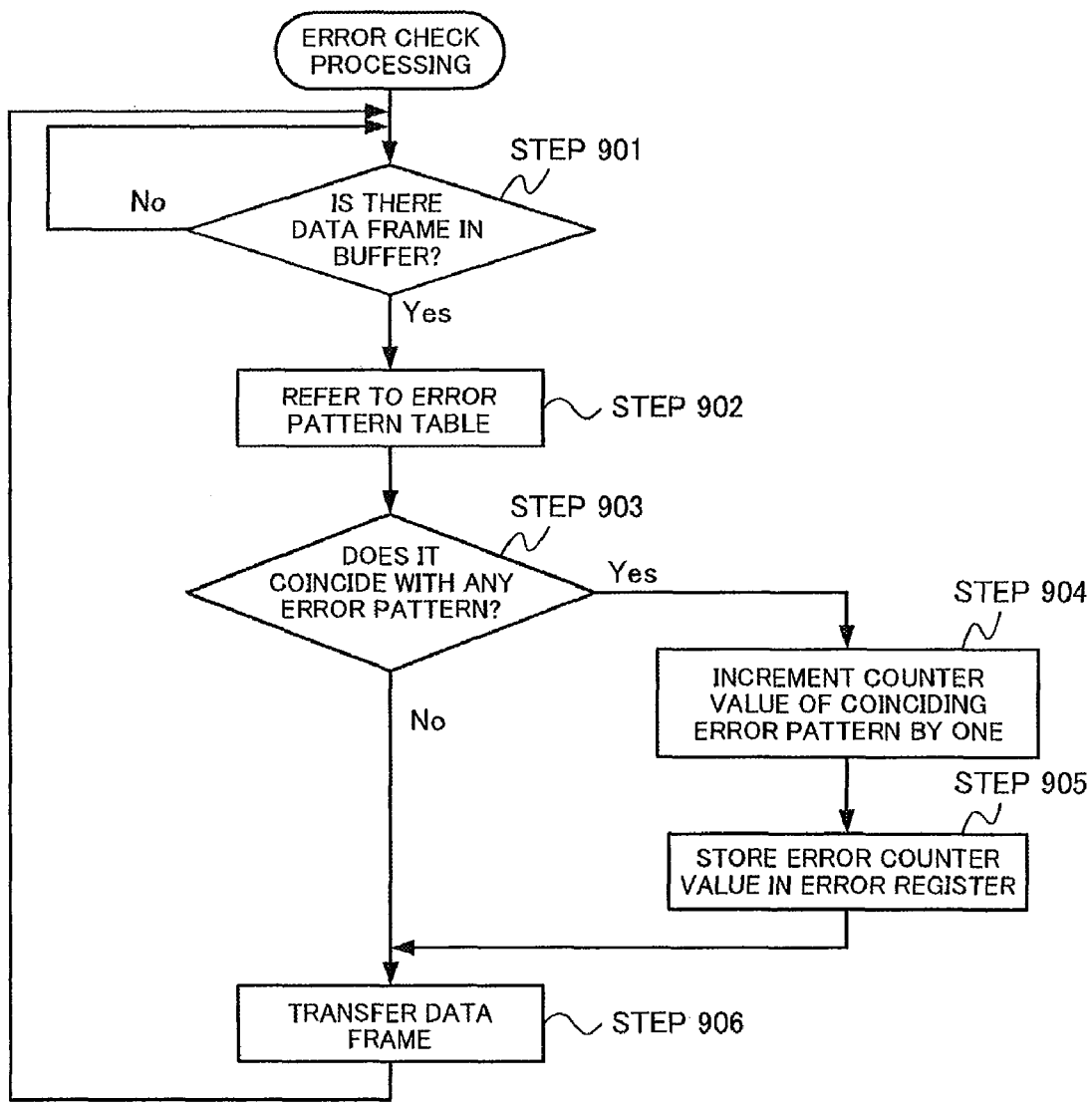
FIG. 9 is a flowchart explaining error check processing in the switch device according to an embodiment of the present invention.

FIG. 9 is a flowchart explaining the error check processing in the switch device 13 according to an embodiment of the present invention.

Specifically, as shown in FIG. 8, the error check circuit 1312 of each port unit 131 of the switch device 13 monitors whether the data frame has been written into the buffer of the port unit 131 (STEP 901). As examples of cases of the data frame being written into the buffer, there is a case when the switch device 13 receives a data frame from the outside via the port 1311 of the port unit 131, and a case when the data frame received by another port unit 131 in the switch device 13 is transferred via the switch circuit 132. The former case is the reception of the data frame, and the latter case is the sending of the data frame. When the data frame is written into the buffer, the error check circuit 1312 refers to the error pattern table 400 (STEP 902), and determines whether the parity in that data frame coincides with any one of the error patterns 401 (STEP 903). The error pattern 401, as described above, is an abnormal bit sequence during the data communication.

If the error check circuit 1312 determines that the parity does not coincide with any one of the error patterns 401 (STEP 903; No), it deems that the data frame is normal, and transfers that data frame to the subsequent [component] (STEP 906). In other words, the error check circuit 1312 sends that data frame to the switch circuit 132 if the data frame is received from the outside, and sends data to another device connected to the port 1311 if the data frame is to be sent to the outside.

Meanwhile, if the error check circuit 1312 determines that the parity coincides with any one of the error patterns 401 (STEP 903; Yes), it increments the error counter value 402 of the coinciding error pattern 401 in the error pattern table 400 by one (STEP 904). Subsequently, the error check circuit 1312 outputs the port number of the port 1311 in which an error has been detected and the error information containing the error counter value 402 to the error signal line E. In response to this, the error information is written into the error register 134. The error check circuit 1312 then transfers that data frame to the subsequent component or device (STEP 906).

Figure 10:
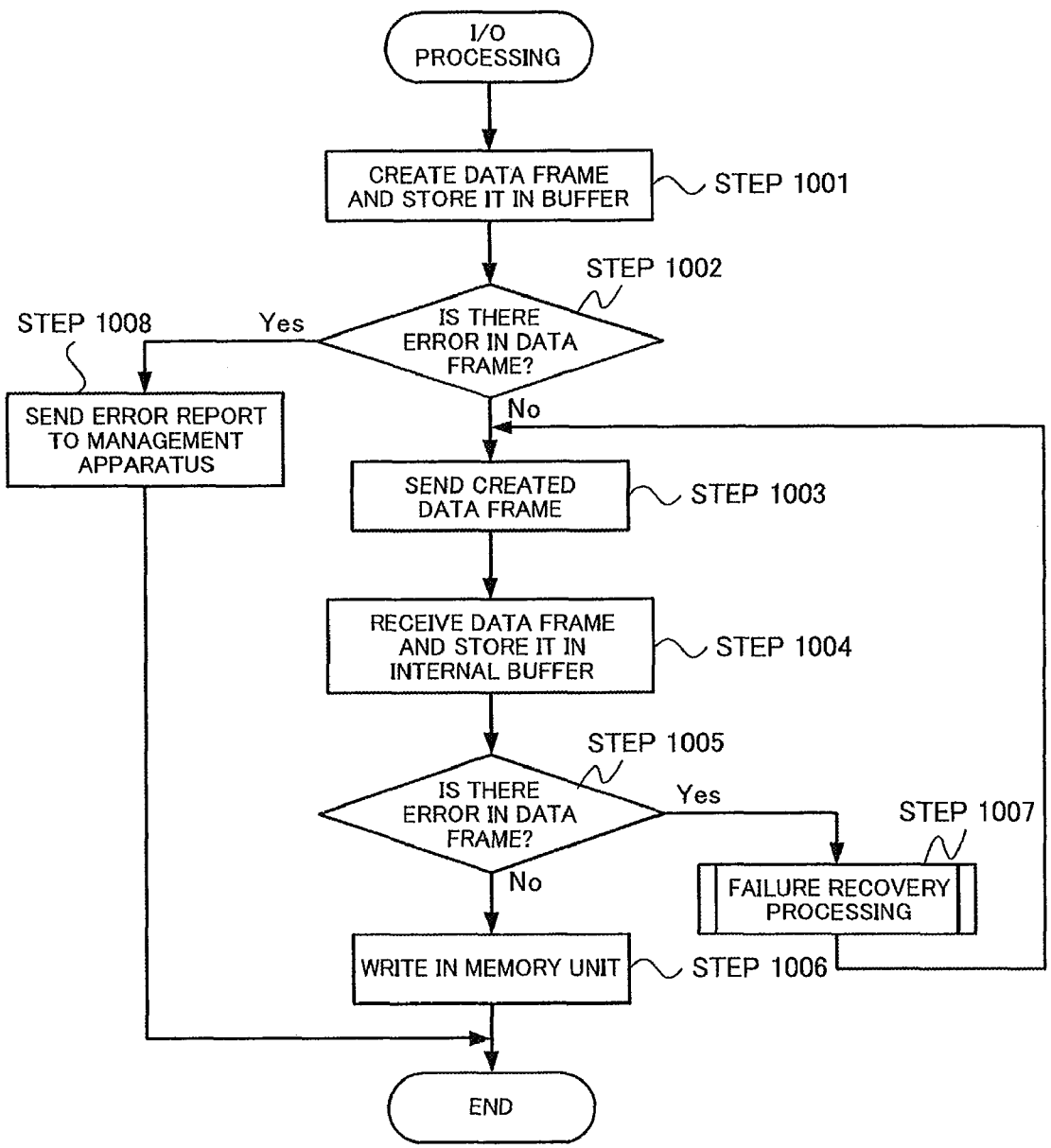
FIG. 10 is a flowchart explaining I/O processing performed by the disk controller according to an embodiment of the present invention.

FIG. 10 is a flowchart explaining the I/O processing to be performed by the disk adapter 123 of the disk controller 120 according to an embodiment of the present invention. The I/O processing to be performed by the disk adapter 123 in this embodiment includes the failure recovery processing to be performed upon detecting an error. The I/O processing may be implemented as an I/O processing program, or as a part of the firmware of the disk adapter 123.

Specifically, as shown in FIG. 10, the disk adapter 123 fetches the command from the memory unit 125, creates a data frame based on a prescribed protocol conversion, and stores the resulting in an internal buffer (STEP 1001). Here, if the command is a read command, a data frame based on that read command is created. If the command is a write command, a data frame based on that write command and the write data is created.

The disk adapter 123 subsequently performs an error check on the created data frame (STEP 1002). The error check in the disk adapter 123, as with the error check processing in the switch device 13, is performed by whether the parity contained in the data frame coincides with a prescribed error pattern. If the disk adapter 123 determines that there is no error in the data frame as a result of the error check (STEP 1002; No), it sends that data frame via the port (STEP 1003). In doing so, the data frame is transferred according to the header information of the data frame via the switch device 13, and is ultimately sent to the destination drive unit 110.

Meanwhile, if the disk adapter 123 determines that there is an error in the data frame (STEP 1002; Yes), it sends an error report to the management apparatus 4 (STEP 1008), and then ends the I/O processing.

The disk adapter 123 receives the data frame sent in response to the sent data frame from the drive unit 110 via the switch device 13, and stores the received data frame in the internal buffer (STEP 1004). Subsequently, the disk adapter 123 performs an error check on the received data frame (STEP 1005).

If the disk adapter 123 determines that there is no error in the received data frame as a result of the error check (STEP 1005; No), it performs protocol conversion to the received data frame, and thereafter writes the converted data frame into the memory unit 125 (STEP 1006). For example, if the command is a read command, the data read from a prescribed area of the hard disk drive 111 will be written into the cache area of the memory unit 125.

Meanwhile, if the disk adapter 123 determines that there is an error in the received data frame (STEP 1005; Yes), it performs the failure recovery processing explained in detail below (STEP 1007). In other words, an error pattern being included in the received data frame means that there is a possibility that a failure has occurred somewhere along the transmission path of the data frame. After performing the failure recovery processing, the disk adapter 123 attempts to resend the data frame (STEP 1003).

Figure 11:
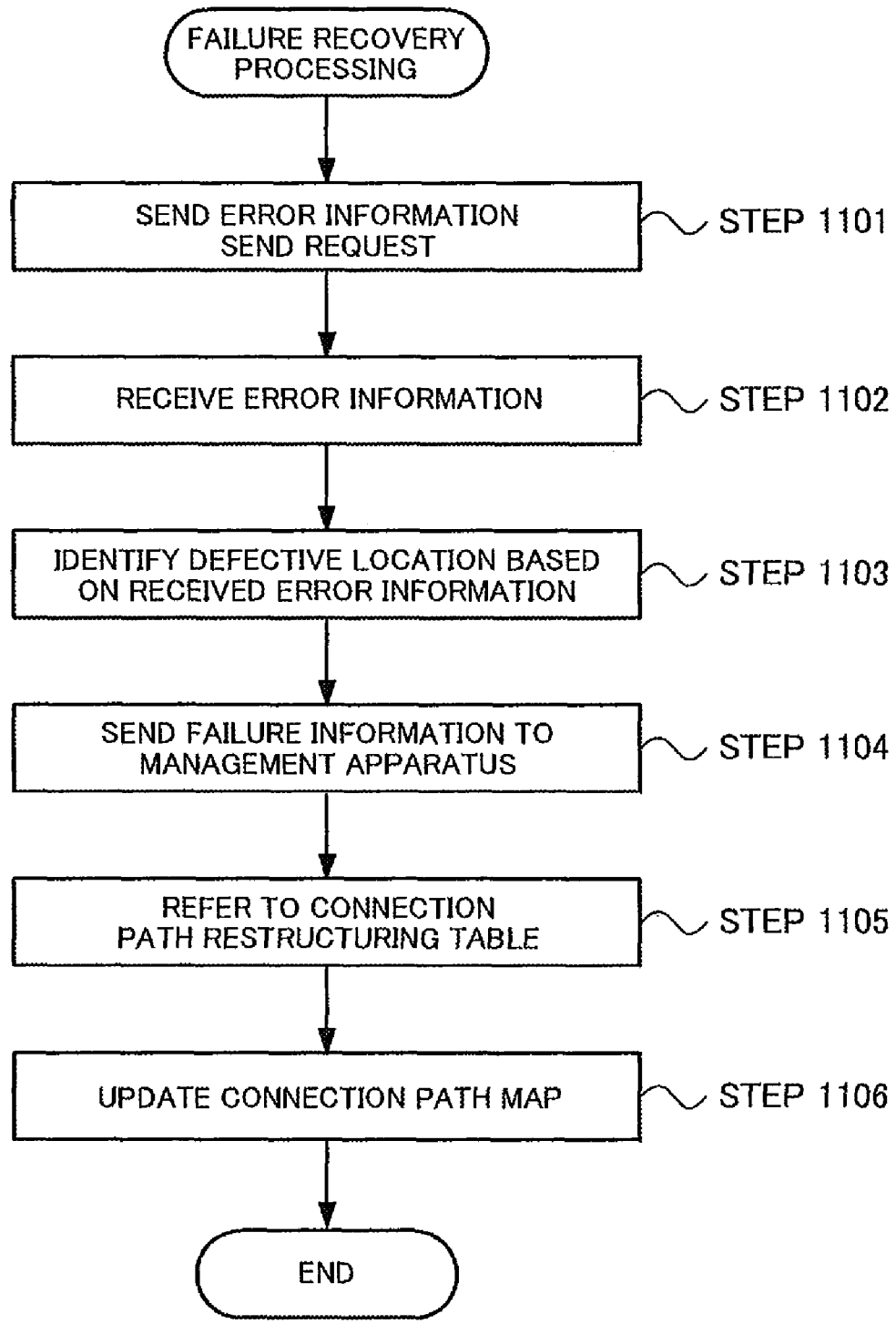
FIG. 11 is a flowchart explaining failure recovery processing performed by the disk controller according to an embodiment of the present invention.

The failure recovery processing includes the processing of identifying the device subject to a failure and the location thereof (fault site) and the processing of creating a new connection path that circumvents the identified fault site. FIG. 11 is a flowchart explaining the failure recovery processing to be performed by the disk adapter 123 of the disk controller 120 according to an embodiment of the present invention.

Specifically, as shown in FIG. 10, if the disk adapter 123 determines that there is an error in the received data frame, it broadcast-transmits an error information send request via the port (STEP 1101). A broadcast transmission is the transmission with all devices on the connection path being the destination. The error information send request is thereby sent to all switch devices 13 cascade-connected to the disk adapter 123. The switch device 13 that received the error information send request sends the error information stored in its own error register 134 to the higher level switch device 13, and additionally transfers the error information send request to the lower level switch device 13.

The disk adapter 123 replies to the error information send request and receives the error information sent from the respective switch devices 13 (STEP 1102). In this embodiment, the error information retained in the error register 134 of each switch device 13 is collected. The error information sent from the switch device 13 from which an error was not detected includes a status that shows "no error."

Subsequently, the disk adapter 123 identifies the fault site based on the collected error information (STEP 1103). The fault site is identified based on the device name and port number of the switch device 13 contained in the error information. Subsequently, the disk adapter 123 creates failure information including the identified fault site, and sends this to the management apparatus 4 (STEP 1104). In response to this, the management apparatus 4 displays failure information on the user interface.

The disk adapter 123 subsequently refers to the connection path restructuring table 800 stored in the memory unit for restructuring the connection path in order to circumvent the identified fault site, and identifies the connection path restructuring pattern 802 from the combination of the identified fault sites (failure pattern 801) (STEP 1105). The disk adapter 123 updates the connection path map 600 according to the identified connection path restructuring pattern 802 (STEP 1105).

As described above, in accordance with the fault sites along the connection path in the storage device 11, a new connection path for circumventing such fault sites is created, and the storage subsystem 1 can continue operating the storage service while ensuring the redundant configuration to the maximum extent possible.

Figure 12:
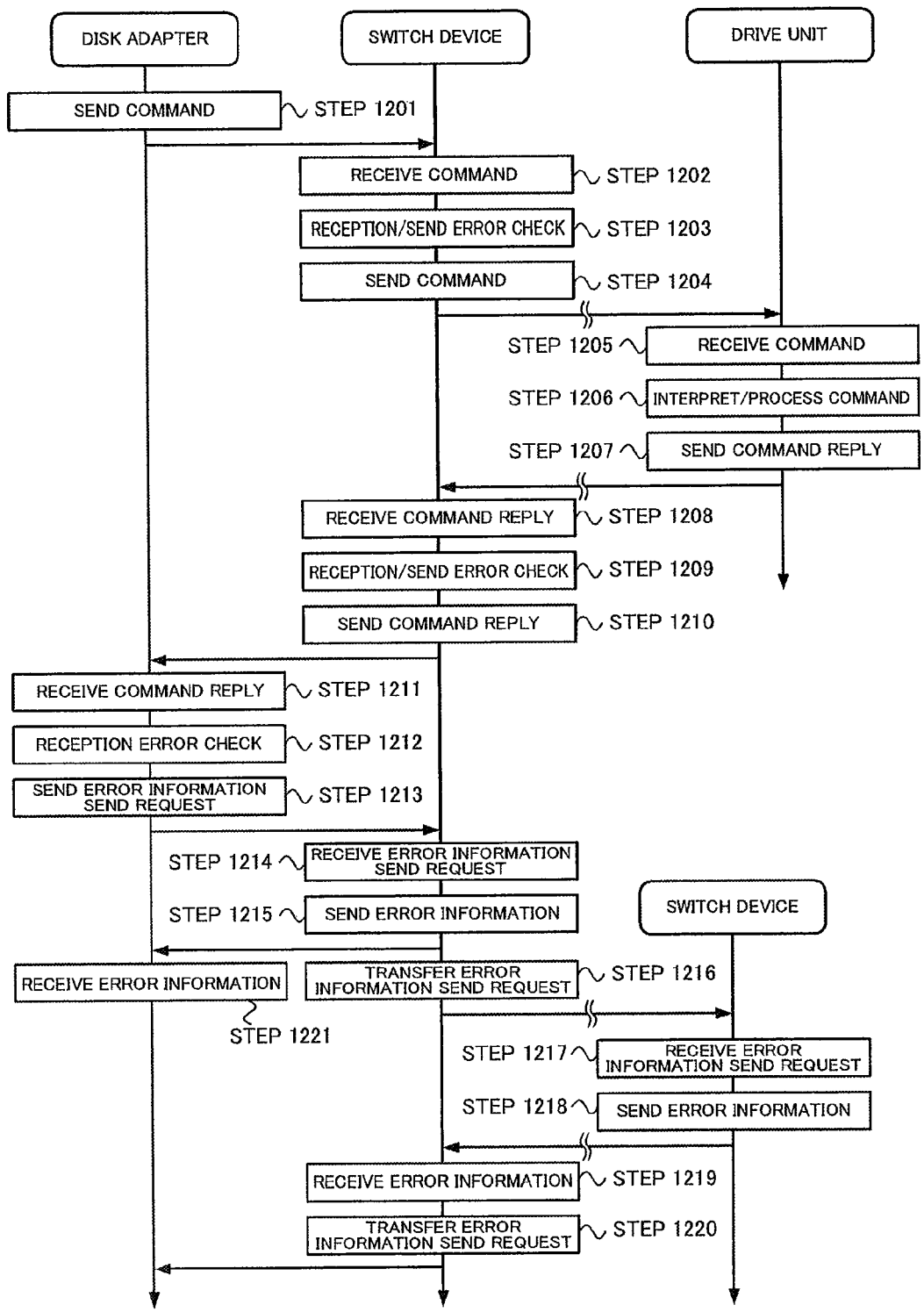
FIG. 12 is a sequence [diagram] explaining the processing to be performed upon detecting an error and which is associated with the I/O processing in the backend of the storage subsystem according to an embodiment of the present invention.

FIG. 12 is a sequence chart explaining the processing to be performed upon detecting an error and which is associated with the I/O processing in the backend of the storage subsystem 1 according to an embodiment of the present invention.

When the disk adapter 123 of the disk controller 120 fetches a command from the memory unit 125, it performs prescribed protocol conversion, and thereafter sends the converted command to the cascade-connected highest level switch device 13 (STEP 1201).

When the highest level switch device 13 receives the command (STEP 1202), it performs reception error check, selects the destination according to the header information, additionally performs a send error check (STEP 1203), and forwards the command to the lower level switch device 13 (STEP 1204). When the lower level switch device 13 receives the command, it similarly performs a reception error check, selects the destination according to the header information, additionally performs a send error check, and forwards the command to an even lower level switch device 13. Each switch device 13 forwards the command to the drive unit 110 if the destination of the command is the drive unit 110 connected to itself.

When the drive unit 110 receives the command (STEP 1205), it performs access processing based on that command (STEP 1206), and forwards the processing result (command reply) in response to that command to the switch device 13 (STEP 1207). The command reply will be a write success status if the command is a write command, whereas the command reply will be the data read from the hard disk drive 111 if the command is a read command. When the switch device 13 receives a command reply (STEP 1208), it similarly performs a reception error check, selects the destination according to the header information, additionally performs a send error check (STEP 1209), and forwards the command to the higher level switch device 13 (STEP 1210). Like this, the disk adapter 123 receives a command reply from the drive unit 110 from one or more switch devices 13 (STEP 1211).

The disk adapter 123 that received the command reply performs a reception error check (STEP 1212). In this example, let it be assumed that an error was detected in the command reply. When the disk adapter 123 detects an error, it broadcast-transmits an error information send request (STEP 1213). A broadcast transmission is the transmission with all switch devices 13 as the destination.

When the switch device 13 receives an error information send request (STEP 1214), it sends the error information stored in its own error register 134 to the higher level switch device 13 (STEP 1215), and additionally transfers the error information send request to the lower level switch device 13 (STEP 1216). The lower level switch device 13 that received the error information send request similarly sends the error information stored in its own error register 134 to the higher level switch device 13, and transfers the error information send request to an even lower level switch device. When the lowest level switch device 13 receives the error information send request (STEP 1217), it sends the error information stored in its own error register 134 to the higher level switch device 13 (STEP 1218). When each switch device 13 receives the error information from the lower level switch device 13 (STEP 1219), it forwards such error information to the higher level switch device 13 (STEP 1220). Like this, the disk adapter 123 collects the error information from all switch devices 13 on the connection path (STEP 1221).

Figure 13:
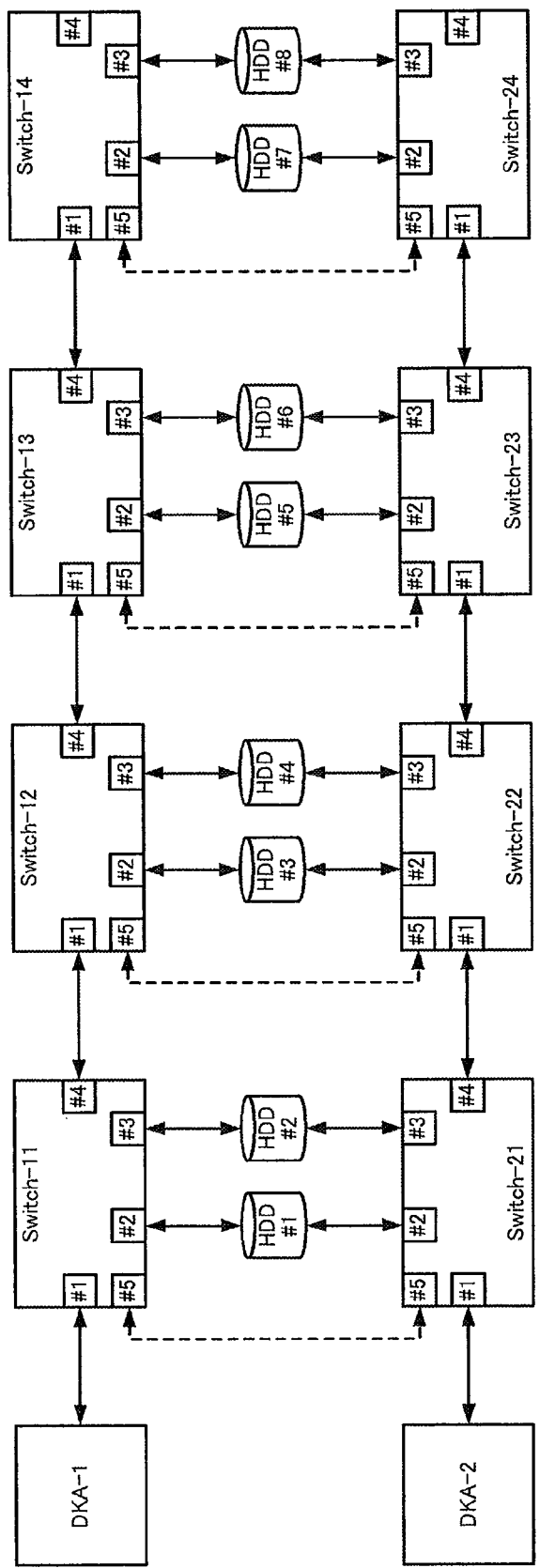
FIG. 13 is a view showing a frame format of the backend in the storage subsystem according to an embodiment of the present invention.

Specific examples of restructuring the connection path based on the failure recovery processing of this embodiment are now explained. FIG. 13 is a view showing the frame format of the backend in the storage subsystem 1 according to an embodiment of the present invention.

As shown in FIG. 13, the backend in the storage subsystem 1 of this embodiment configures a connection path whereby the disk adapters 123 of the redundant disk controller 120 cascade-connect four switch devices 13, and each switch device 13 connects the drive unit 110. The configuration of this kind of backend interface is shown as the connection path map 600 illustrated in FIG. 6 and FIG. 7.

In the ensuing explanation, the disk adapter 123 of the first disk controller 120 is referred to as "DKA-1," and the four switch devices 13 connected thereto are respectively referred to as "Switch-11," "Switch-12," "Switch-13," and "Switch-14." The disk adapter 123 of the second disk controller 120 is referred to as "DKA-2," and the four switch devices 13 connected thereto are respectively referred to as "Switch-21," "Switch-22," "Switch-23," and "Switch-24." In addition, the drive units 110 connected to "Switch-11" and "Switch-21" are referred to as "HDD #1" and "HDD #2," the drive units connected to "Switch-12" and "Switch-22" are referred to as "HDD #3" and "HDD #4," the drive units connected to "Switch-13" and "Switch-23" are referred to as "HDD #5" and "HDD #6," and the drive units connected to "Switch-14" and "Switch-24" are referred to as "HDD #7" and "HDD #8." In FIG. 13, the number that follows the # sign in each switch device 13 refers to the port number of the port 1311. The arrows shown with a solid line represent that the status of the port 1311 is enabled, and the arrows shown with a dotted line represent that the status of the port 1311 is disabled (Specific Example 1).

Figure 14:
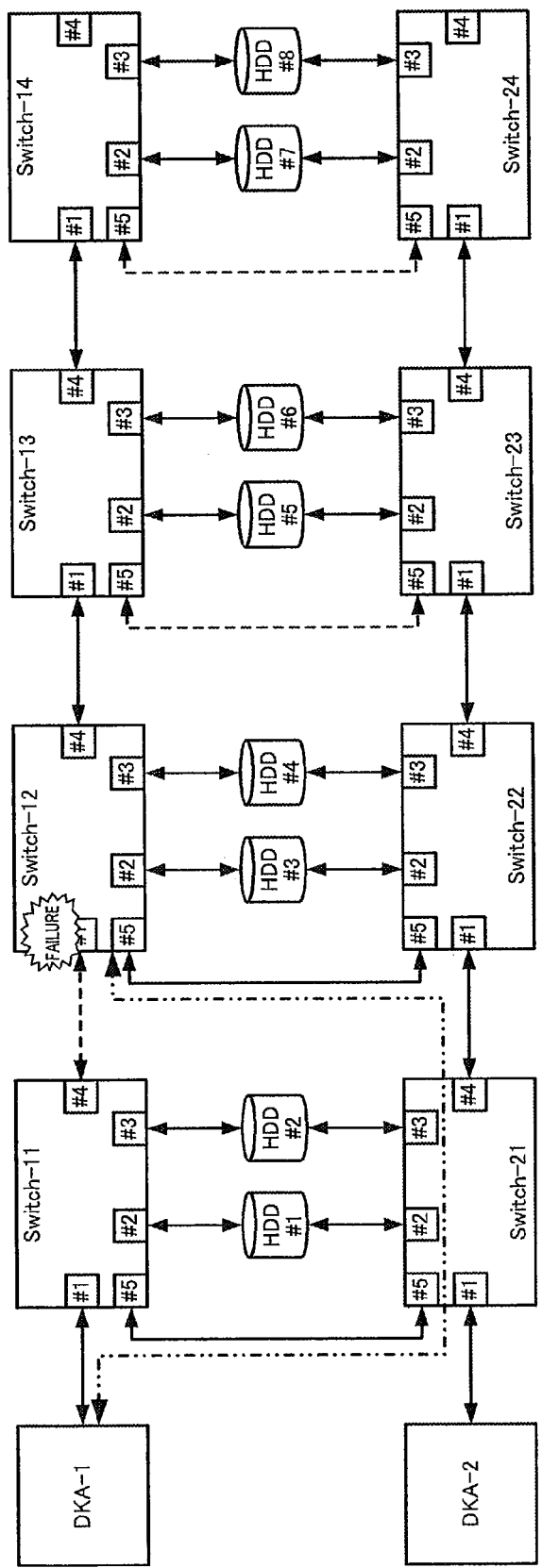
FIG. 14 is a view showing a frame format of the backend in the storage subsystem according to an embodiment of the present invention.

Now, as shown in FIG. 14, let it be assumed that a failure occurred in port number #1 of Switch-12. When DKA-1, as described above, sends an error information send request and recognizes the fault site, it refers to the connection path restructuring table 800 shown in FIG. 8, and determines the connection path restructuring pattern 802 required for circumventing the fault site. In this example, since a failure occurred in port number #1 of Switch-12, the connection path restructuring pattern shown in the first line is selected. Thus, DKA-1 enables port number #5 of Switch-11, port number #5 of Switch-12, port number #5 of Switch-21, and port number #5 of Switch-22, and additionally disables port number #4 of Switch-11 and port number #4 of Switch-12. Thereby, an alternative path that passes through Switch-11, Switch-21, and Switch-22 is established between DKA-1 and Switch-12 (depicted with a two-dot chain line in FIG. 14). FIG. 15 and FIG. 16 show the connection path map 600 in this case (Specific Example 2).

Figure 17:
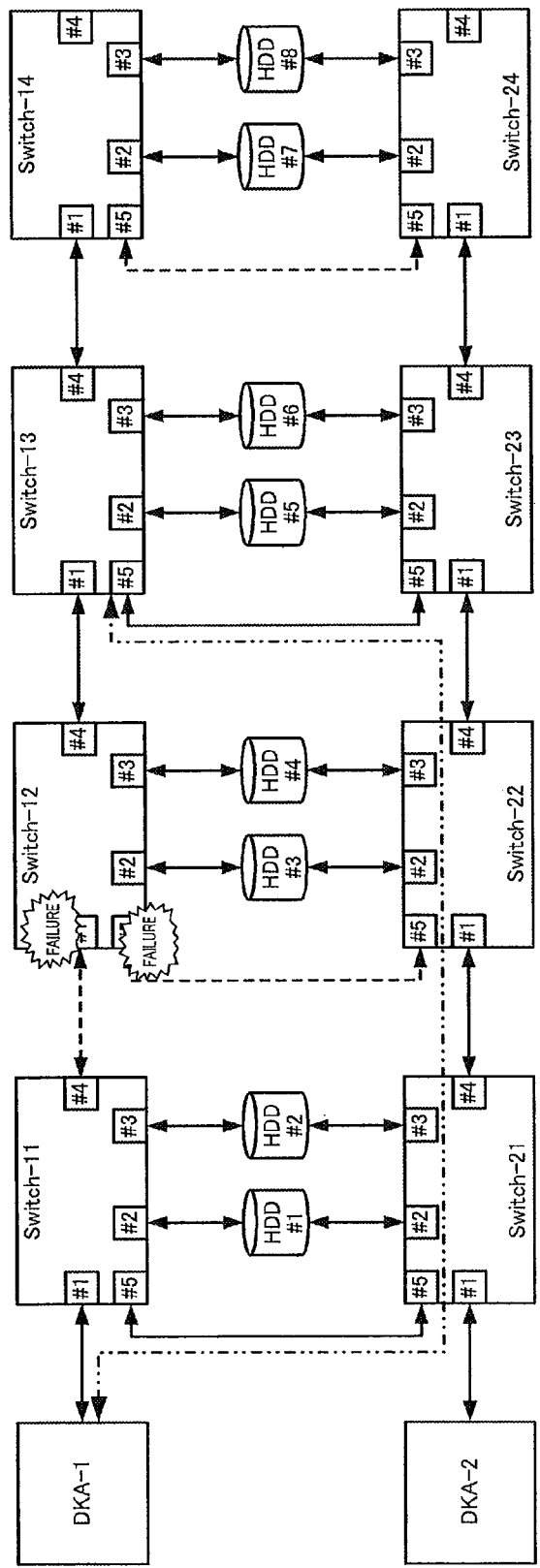
FIG. 17 is a view showing a frame format of the backend in the storage subsystem according to an embodiment of the present invention.

As shown in FIG. 17, let it be assumed that a failure occurred in port numbers #1 and #5 of Switch-12. Here, DKA-1, according to the connection path restructuring table 800 shown in FIG. 8, respectively enables port number #5 of Switch-11, port number #5 of Switch-13, port number #5 of Switch-21, and port number #5 of Switch-23, and disables port number #4 of Switch-11 and port number #4 of Switch-12. Thereby, an alternative path that passes through Switch-11, Switch-21, Switch-22, and Switch-23 is established between DKA-1 and Switch-13 (Specific Example 3).

Figure 18:
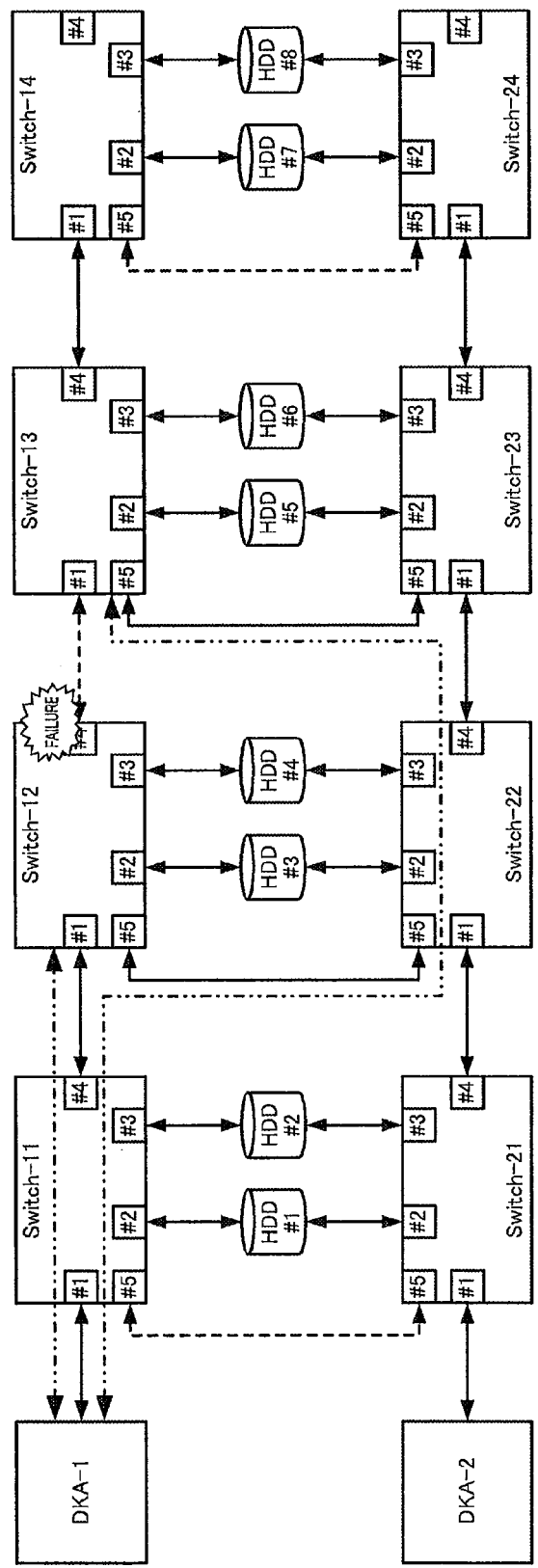
FIG. 18 is a view showing a frame format of the backend in the storage subsystem according to an embodiment of the present invention.

As shown in FIG. 18, let it be assumed that a failure occurred in port number #4 of Switch-12. Here, DKA-1 respectively enables port number #5 of Switch-12, port number #5 of Switch-13, port number #5 of Switch-22, and port number #5 of Switch-23, and disables port number #4 of Switch-12 and port number #4 of Switch-13. Thereby, an alternative path that passes through Switch-11, Switch-12, Switch-22, and Switch-23 is established between DKA-1 and Switch-13 (Specific Example 4).

Figure 19:
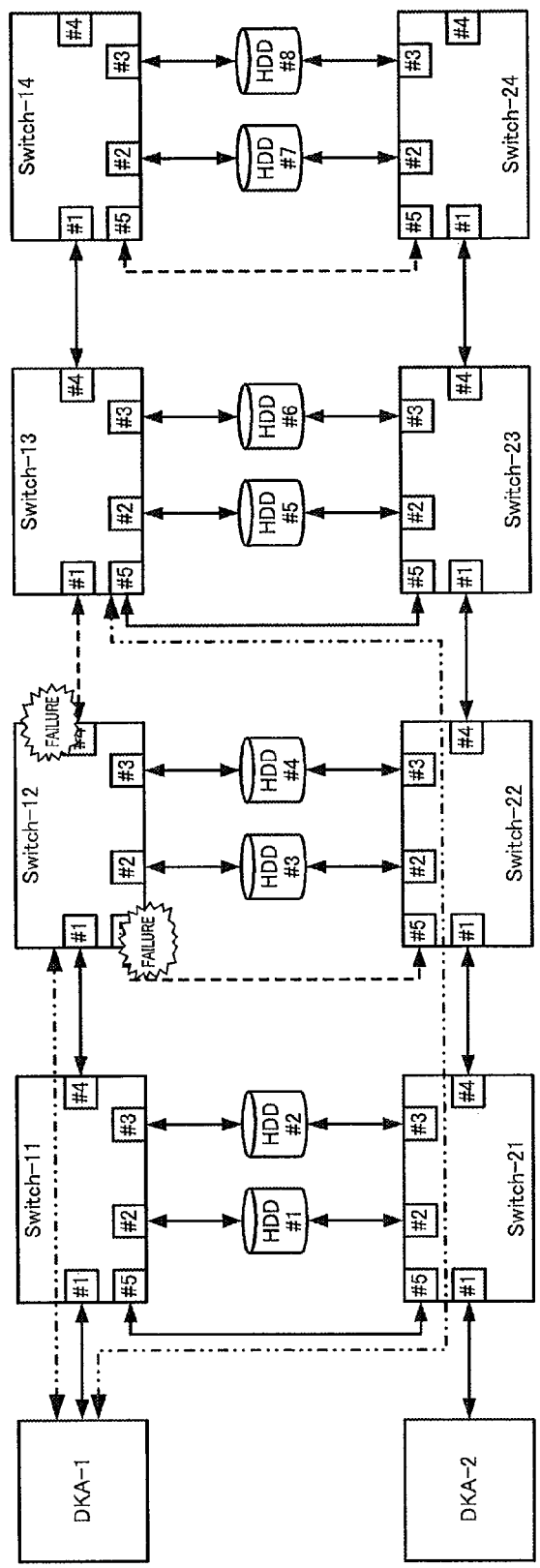
FIG. 19 is a view showing a frame format of the backend in the storage subsystem according to an embodiment of the present invention.

As shown in FIG. 19, let it be assumed that a failure occurred in port numbers #4 and #5 of Switch-12. Here, DKA-1 respectively enables port number #5 of Switch-11, port number #5 of Switch-13, port number #5 of Switch-21, and port number #5 of Switch-23, and disables port number #4 of Switch-11 and port number #1 of Switch-13. Thereby, an alternative path that passes through Switch-11, Switch-21, Switch-22, and Switch-23 is established between DKA-1 and Switch-13 while maintaining the path between DKA-1 and Switch-12 (Specific Example 5).

Figure 20:
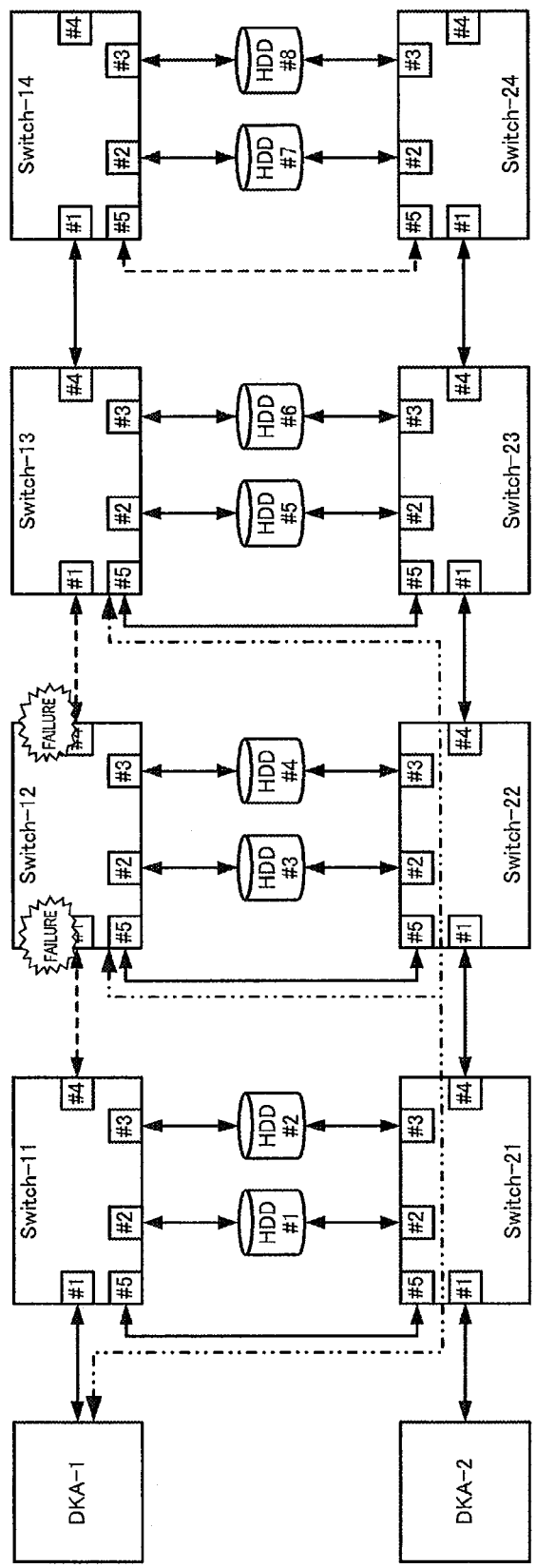
FIG. 20 is a view showing a frame format of the backend in the storage subsystem according to an embodiment of the present invention.

As shown in FIG. 20, let it be assumed that a failure occurred in port numbers #1 and #4 of Switch-12. Here, DKA-1 respectively enables port number #5 of Switch-11, port number #5 of Switch-12, port number #5 of Switch-13, port number #5 of Switch-21, port number #5 of Switch-22, and port number #5 of Switch-23, and disables port number #4 of Switch-11, port numbers #1 and #4 of Switch-12, and port number #4 of Switch-13. Thereby, an alternative path that passes through Switch-11, Switch-21, and Switch-22 is created between DKA-1 and Switch-12, and an alternative path that passes through Switch-11, Switch-21, Switch-22, and Switch-23 is established between DKA-1 and Switch-13 (Specific Example 6).

Figure 21:
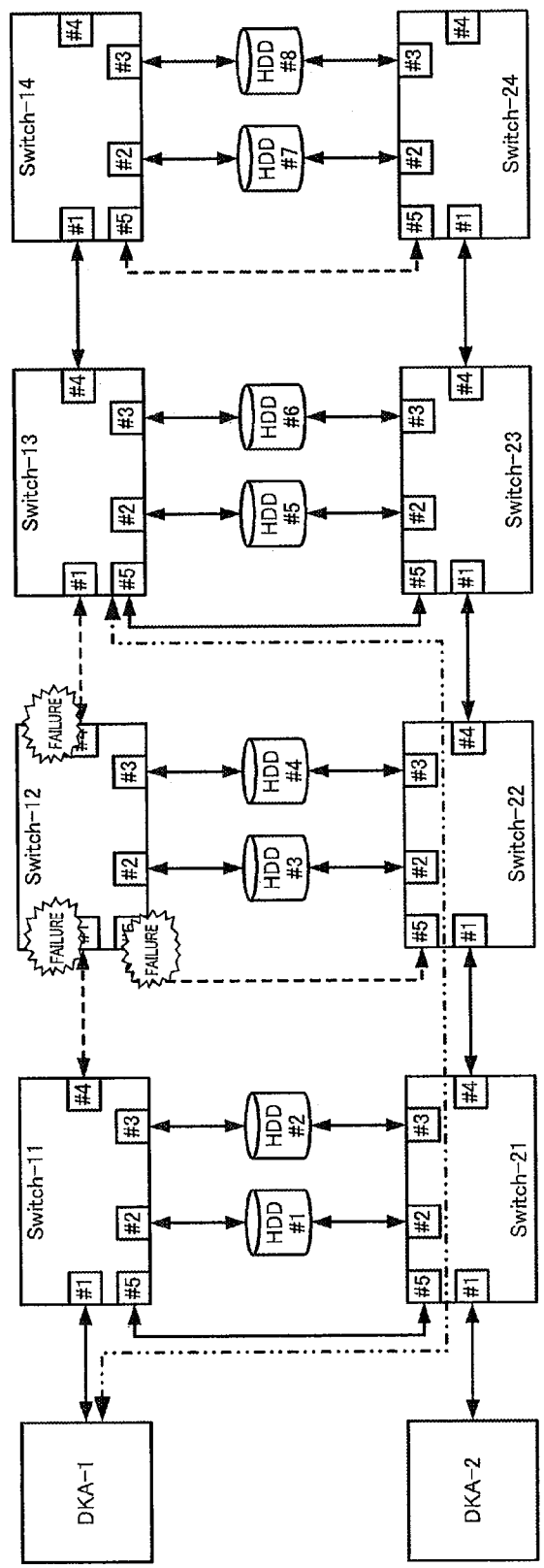
FIG. 21 is a view showing a frame format of the backend in the storage subsystem according to an embodiment of the present invention.

As shown in FIG. 21, let it be assumed that a failure occurred in port numbers #1, #4, and #5 of Switch-12. Here, DKA-1 respectively enables port number #5 of Switch-11, port number #5 of Switch-13, port number #5 of Switch-21, and port number #5 of Switch-23, and disables port number #4 of Switch-11, and port numbers #1 and #4 of Switch-21. Thereby, an alternative path that passes through Switch-11, Switch-21, Switch-22, and Switch-23 is established between DKA-1 and Switch-13.

Second Embodiment

Figure 22:
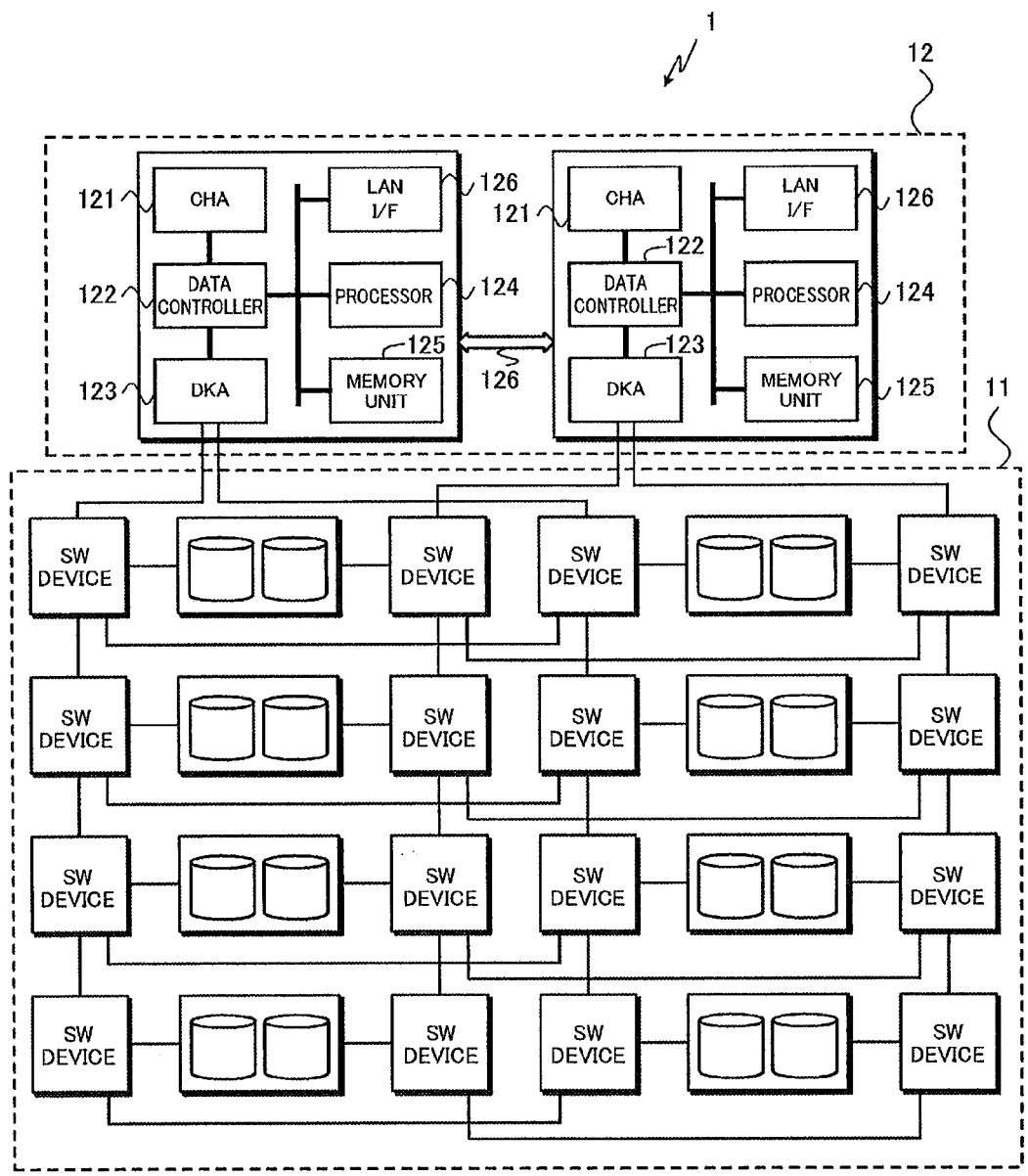
FIG. 22 is a diagram showing the configuration of the storage subsystem according to an embodiment of the present invention.

FIG. 22 is a diagram showing the configuration of a storage subsystem according to another embodiment of the present invention.

As shown in FIG. 22, the storage subsystem 1 of this embodiment is configured such that the disk adapter 123 of each disk controller 120 controls a plurality of channels (two channels in FIG. 22) of the storage device 11. Each switch device 13 in each channel, as with the foregoing embodiment, is connected in a cascade and respectively connects the drive unit 110, but each switch device 13 is connected to the corresponding switch device 13 in another channel of the same disk adapter 123. The contents of the connection path map 400 and the connection path restructuring table 800 are defined according to this kind of configuration. The configuration and the processing contents of the other components are the same as the foregoing embodiment.

Figure 23:
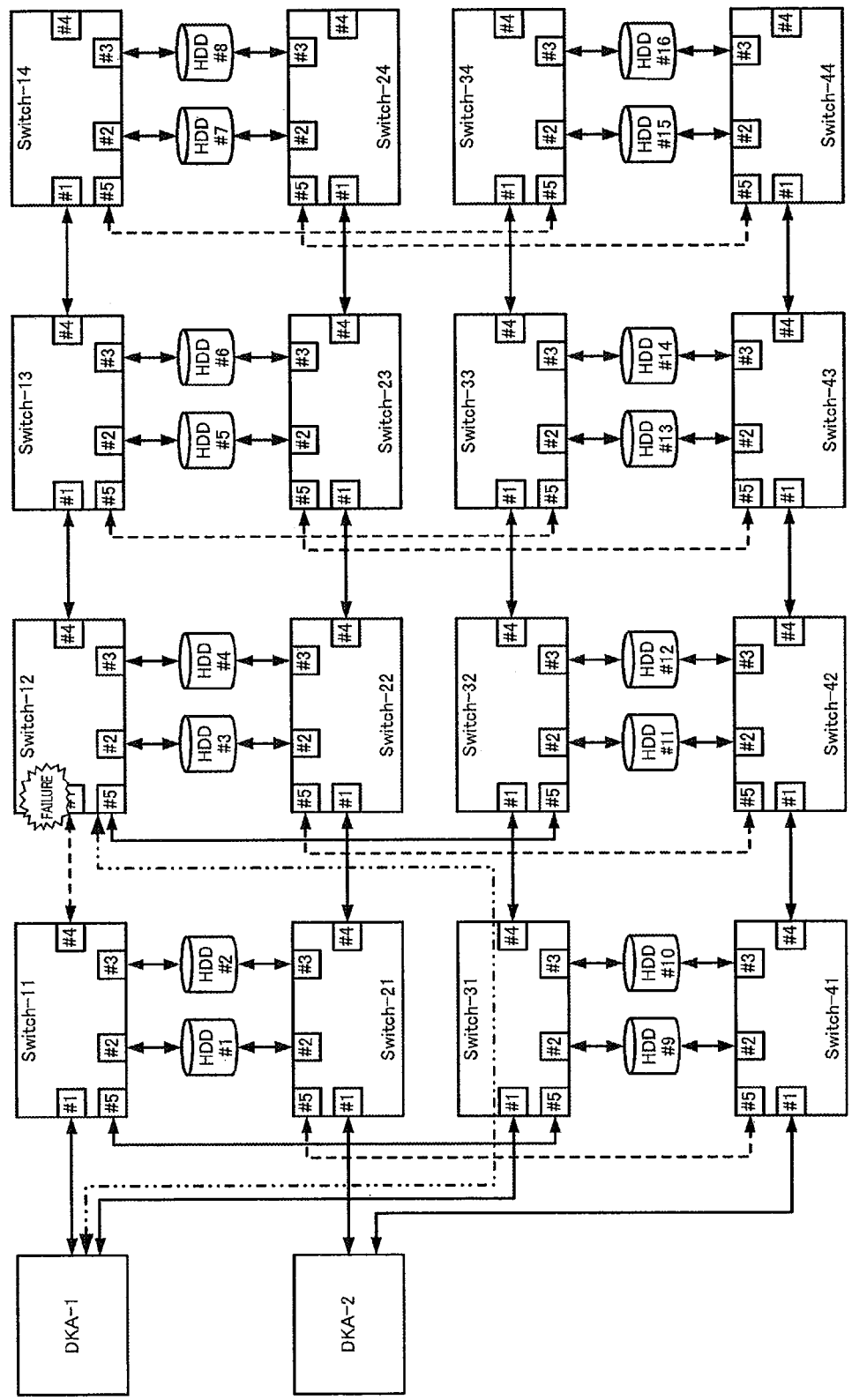
FIG. 23 is a view showing a frame format of the backend in the storage subsystem according to an embodiment of the present invention.

FIG. 23 is a view showing a frame format of the backend in the storage subsystem 1 according to an embodiment of the present invention, and FIG. 23 specifically shows the restructured connection path in a case where a failure occurred in the port 1311 indicated with port number #1 of the switch device 13 indicated with Switch-12. The failure recovery processing to be performed by the disk adapter 123 is the same as the foregoing embodiment.

Specifically, when DKA-1 identifies port number #1 of Switch-12 as the fault site, it restructures the connection path according to a prescribed connection path restructuring table. In this example, DKA-1 respectively enables port number #5 of Switch-11, port number #5 of Switch-12, port number #5 of Switch-31, and port number #5 of Switch-32, and disables port number #4 of Switch-11 and port number #4 of Switch-12.

It is noted that the corresponding switch devices 13 forming the path for circumventing the fault site belong under the control of the same disk adapter 123. Namely, even in a case where an error is detected in the switch device 13 in any one of the channels belonging to one disk adapter 123, the other disk adapter 123 does not intervene in the restructured connection path. Accordingly, since there will be no competition among the disk adapters 123 in the redundant disk controller 120, data frames can be transferred even more efficiently.

Third Embodiment

In this embodiment when the port 1311 of the path switch device 13 enters a busy status, the restructure processing of the connection path is performed. This embodiment can be adopted in either configuration of the storage subsystem 1 shown in the first embodiment and second embodiment as described above.

Figure 24:
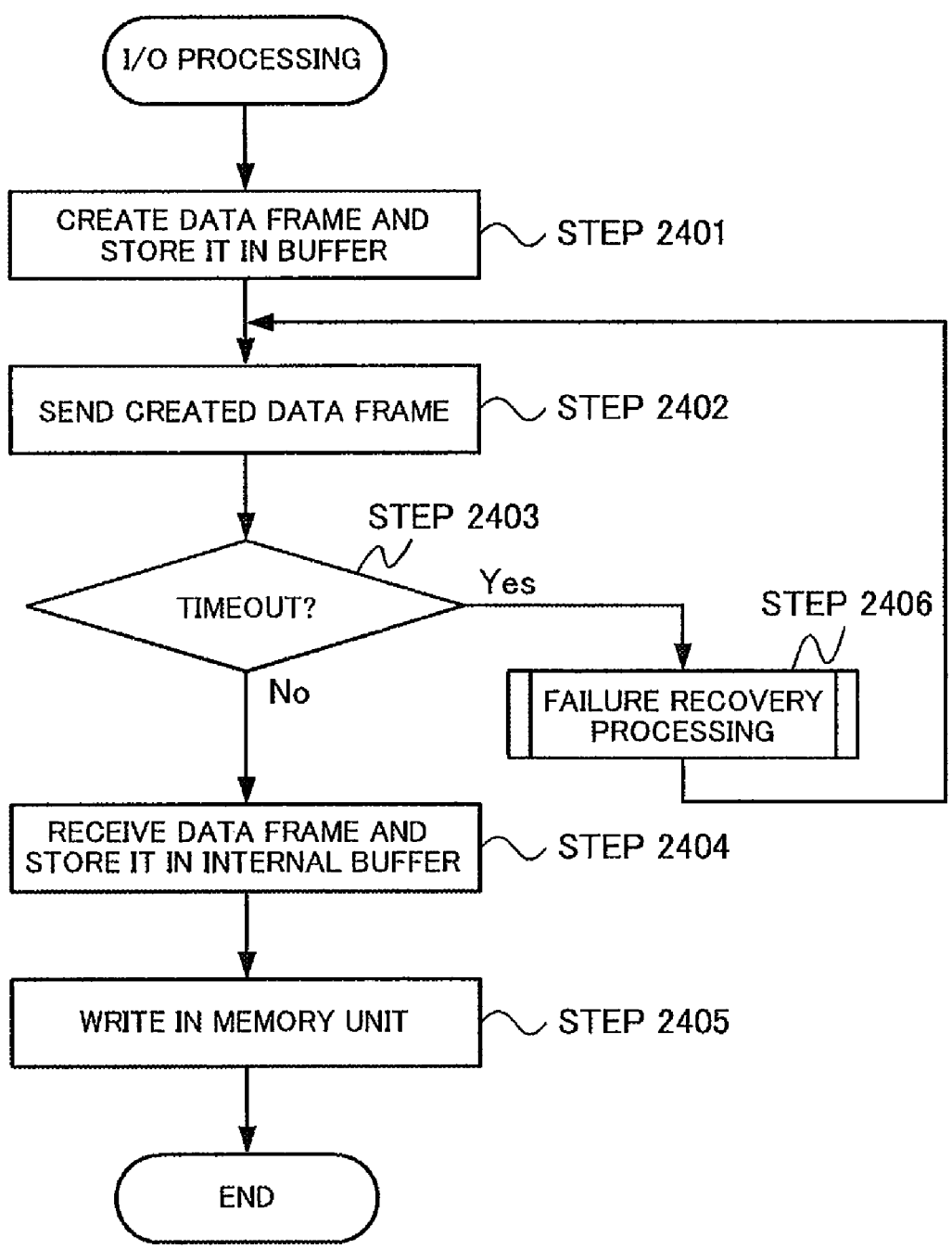
FIG. 24 is a flowchart explaining I/O processing performed by the disk controller according to an embodiment of the present invention.

FIG. 24 is a flowchart explaining the I/O processing to be performed by the disk adapter 123 of the disk controller 120 according to an embodiment of the present invention. The I/O processing to be performed by the disk adapter 123 in this embodiment differs from the foregoing embodiments in that it includes the processing of detecting a transfer delay of the data frame.

Specifically, as shown in FIG. 24, the disk adapter 123 fetches a command stored in the memory unit 125, creates a data frame based on a prescribed protocol conversion, and stores the converted data frame in an internal buffer (STEP 2401).

The disk adapter 123 subsequently sends the data frame via a port (STEP 2402). The disk adapter 123, as with the previous embodiments, may also perform an error check on the sent data frame. Consequently, the data frame is transferred according to the header information of the data frame via the switch device 13, and ultimately sent to the destination drive unit 110.

The disk adapter 123 monitors whether there is a command reply within a prescribed time after the sending of the data frame (STEP 2403). If there is no command reply within a prescribed time, this is determined to be a timeout. If the disk adapter 123 receives a command reply within a prescribed time (STEP 2403; No), it stores the received data frame in an internal buffer (STEP 2404), performs a prescribed protocol conversion, and writes the converted data frame into the memory unit 125 (STEP 2405).

Meanwhile, if the disk adapter 123 does not receive a command reply within a prescribed time (STEP 2403; Yes), it determines that a failure has occurred, and performs the failure recovery processing explained in detail below (STEP 2406). After performing the failure recovery processing, the disk adapter 123 attempts to resend the data frame (STEP 2402).

Figure 25:
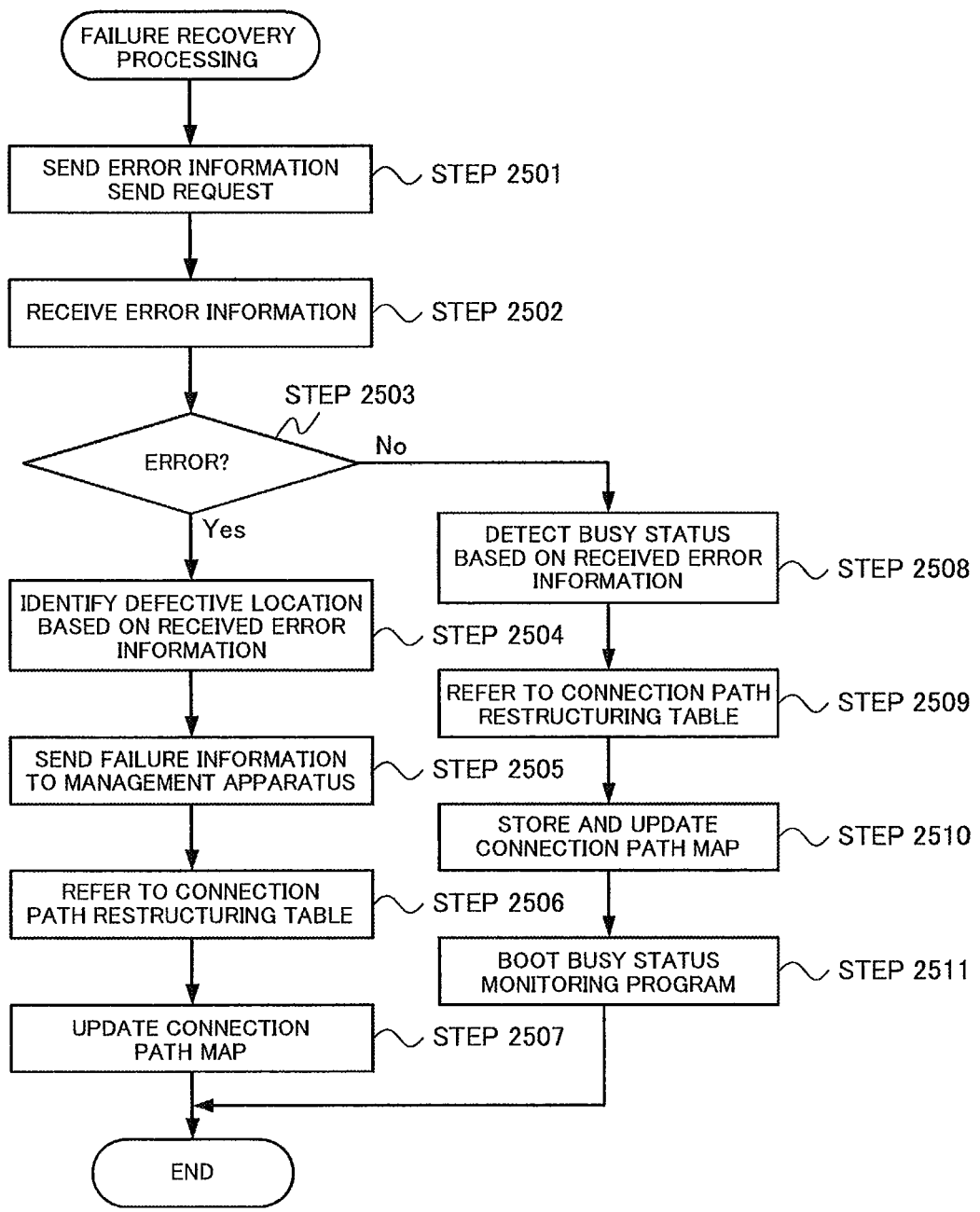
FIG. 25 is a flowchart explaining failure recovery processing performed by the disk controller according to an embodiment of the present invention.

FIG. 25 is a flowchart explaining the failure recovery processing to be performed by the disk adapter 123 of the disk controller 120 according to an embodiment of the present invention.

Specifically, as shown in FIG. 25, when the disk adapter 123 determines that there is an error in the received data frame, it broadcast-transmits an error information send request via a port (STEP 2501). By way of this, the disk adapter 123 can collect error information from all switch devices 13 (STEP 2502). Here, since there is a possibility that a port 1311 of a busy status is included in the path for collecting the error information, it is preferable to set the timeout time until receiving a reply (error information) to be longer in comparison to the timeout time upon sending a command in normal cases. In this embodiment, the error information sent from the switch device 13 includes reception/send error information of each port 1311 and busy information of each port 1311. The reception/send error information is equivalent to the error information shown in FIG. 5.

Subsequently, the disk adapter 123 determines whether reception/send error information is contained in the collected error information (STEP 2503). If reception/send error information is contained in the collected error information (STEP 2503; Yes), the disk adapter 123 identifies the fault site based on the collected error information (STEP 2504). Since the subsequent processing is the same as STEP 1104 to STEP 1106 illustrated in FIG. 11, the explanation thereof is omitted.

If the disk adapter 123 determines that reception/send error information is not contained in the collected error information (STEP 2503; No), it identifies the location of a busy status as the fault site based on the busy information contained in the collected error information (STEP 2508). The disk adapter 123 subsequently refers to the connection path restructuring table 800 stored in the memory unit for restructuring the connection path in order to circumvent the identified fault site, and identifies the connection path restructuring pattern 802 (STEP 2509).

The disk adapter 123 thereafter creates a backup of the current connection path map 600, and updates the connection path map 600 according to the identified connection path restructuring pattern 802 (STEP 2510). The disk adapter 123 separately boots the busy status monitoring processing (STEP 2510), and then ends the failure recovery processing. The busy status monitoring processing monitors whether the busy status of the port 1311 that was determined to be of a busy status has been eliminated, and restores the connection path map to its original setting when it determines that the busy status has been eliminated.

Figure 26:
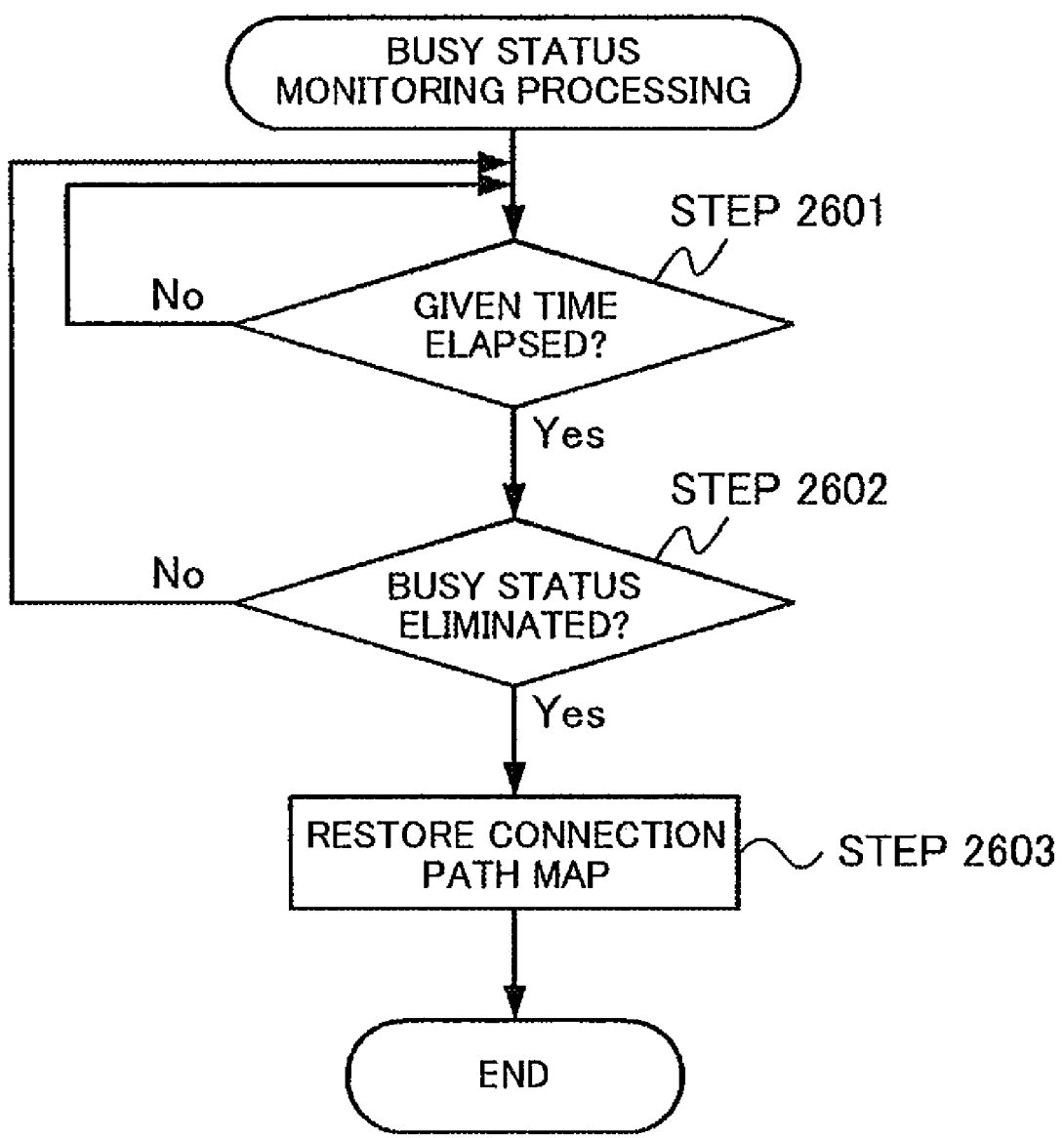
FIG. 26 is a flowchart explaining busy status monitoring processing performed by the disk controller according to an embodiment of the present invention.

FIG. 26 is a flowchart explaining the busy status monitoring processing to be performed by the disk adapter 123 according to an embodiment of the present invention. The busy status monitoring processing is executed independently (with a different sled) from the I/O processing described above.

Specifically, as shown in FIG. 26, each time a given time elapses (STEP 2601; Yes), the disk adapter 123 checks whether the busy status of the port 1311 that was determined to be of a busy status has been eliminated (STEP 2602). If the disk adapter 123 determines that the busy status of the port 1311 has been eliminated (STEP 2602; Yes), it replaces the restructured connection path map with the backed up connection path map 600 (STEP 2603). Thereby, the connection path in the storage device 11 will be restored to the connection path before the occurrence of a busy status.

As described above, in accordance with the busy status of locations along the connection path in the storage device 11, a new connection path for circumventing such locations of a busy status is created, and the storage subsystem 1 can continue operating the storage service while ensuring the redundant configuration to the maximum extent possible.

In addition, since the storage subsystem 1 is restored to its original connection path when the busy status is eliminated, the operation of a more flexible and effective storage service is possible.

Although this embodiment explained a case where the disk adapter 123 does not perform an error check and writes such command reply into the memory unit 125 upon receiving a command reply within a prescribed time, as with the embodiments described above, it may also perform an error check, and then perform failure recovery processing according to the result of the error check.

Other Embodiments

Each of the embodiments described above is an exemplification for explaining the present invention, and is not intended to limit this invention only to such embodiments. The present invention may be modified in various modes so as long as the modification does not deviate from the gist of this invention. For example, although the embodiments described above explained the processing of the various programs sequentially, the present invention is not limited thereto. Thus, so as long as there are no contradictions in the processing result, the configuration may be such that the order of the processing is interchanged or the processes are performed in parallel.

Moreover, although the foregoing embodiments explained a case such that the disk adapter 123 performs the failure recovery processing, the present invention is not limited thereto. For example, in substitute for the disk adapter 123, the configuration may be such that the processor 124 performs the failure recovery processing and the like.

Further, although the embodiments described above explained a case where the drive unit 110 and the switch device 13 are configured as separate components, the drive unit 110 may be configured such that it includes the functions of the switch device 13.

The present invention can be broadly applied to storage subsystems that adopt a redundant path configuration and form a connection path using a plurality of switch devices.

What is claimed is:

1. A storage subsystem comprising:
   a plurality of drive units including a storage medium for storing data;
   a plurality of first switch devices including a plurality of ports and connecting at least one of the plurality of drive units to at least one of the plurality of ports therein;
   a first disk controller connecting at least one of the plurality of first switch devices and configured to control the plurality of drive units;
   a plurality of second switch devices including a plurality of ports and connecting at least one of the plurality of drive units to at least one of the plurality of ports therein, each of the plurality of second switch devices corresponding to each of the plurality of first switches; and
   a second disk controller connected to at least one of the plurality of second switch devices and configured to control the plurality of drive units,
   wherein at least one of the plurality of ports in each of the plurality of first switch devices and at least one of the plurality of ports in each of the corresponding plurality of second switch devices are interconnected.

2. The storage subsystem according to claim 1,
   wherein the plurality of first switch devices and the plurality of second switch devices are respectively connected in a cascade via their own the plurality of ports.

3. The storage subsystem according to claim 2,
   wherein the first disk controller includes a first connection path map for managing a device connected to each of the plurality of ports in each of the plurality of first switch devices and the connection status of each of the plurality of ports; and
   wherein the second disk controller includes a second connection path map for managing a device connected to each of the plurality of ports in each of the plurality of second switch devices and the connection status of each of the plurality of ports.

4. The storage subsystem according to claim 3,
   wherein each of the plurality of first switch devices and each of the plurality of second switch devices comprise an error check circuit configured to check an error in a data frame to be sent to each of the plurality of ports; and
   wherein the error check circuit outputs prescribed error information upon detecting an error in the data frame.

5. The storage subsystem according to claim 4,
   wherein at least one of the first disk controller and the second disk controller sends a data frame based on a command for accessing at least one of the plurality of drive units via at least one of the plurality of switch devices connected to itself; and
   sends an error information send request to the plurality of switch devices upon detecting an error in the data frame sent in reply to the command.

6. The storage subsystem according to claim 5,
   wherein each of the plurality of switch devices connected to the at least one disk controller sends the error information to the at least one disk controller in reply to the error information send request.

7. The storage subsystem according to claim 6,
   wherein the at least one disk controller identifies the switch device and port in which an error has been detected as a fault site based on the error information sent from each of the plurality of switch devices in reply to the error information send request.

8. The storage subsystem according to claim 7,
   wherein the at least one disk controller updates the contents of its own the connection path map based on the identified fault site and according to a prescribed connection path restructuring pattern.

9. The storage subsystem according to claim 1,
   wherein at least one of the first disk controller and the second disk controller sets the connection status of at least one of the plurality of switch devices connected to itself and at least one of the plurality of ports in each of the corresponding switch devices to an enabled status.

10. The storage subsystem according to claim 3,
    wherein each of the plurality of first switch devices and each of the plurality of second switch devices output busy information in each of its own the plurality of ports.

11. The storage subsystem according to claim 10,
    wherein at least one of the first disk controller and the second disk controller updates the contents of its own the connection path map, based on the busy information output from one of the plurality of first switch devices or one of the plurality of second switch devices, according to a prescribed connection path restructuring pattern.

12. A storage subsystem comprising:
a plurality of first drive units including a storage medium for storing data;
a plurality of second drive units including a storage medium for storing data;
a plurality of first switch devices including a plurality of ports and connecting at least one of the plurality of first drive units to at least one of the plurality of ports therein;
a plurality of second switch devices including a plurality of ports and connecting at least one of the plurality of first drive units to at least one of the plurality of ports therein, each of the plurality of second switch devices corresponding to each of the plurality of first switches;
a plurality of third switch devices including a plurality of ports and connecting at least one of the plurality of second drive units to at least one of the plurality of ports therein;
a plurality of fourth switch devices including a plurality of ports and connecting at least one of the plurality of second drive units to at least one of the plurality of ports therein;
a first disk controller connected to at least one of the plurality of first switch devices and configured to control the plurality of first drive units, and connected to at least one of the plurality of third switch devices and configured to control the plurality of second drive units; and
a second disk controller connected to at least one of the plurality of second switch devices and configured to control the plurality of first drive units, and connected to at least one of the plurality of fourth switch devices and configured to control the plurality of second drive units,
wherein at least one of the plurality of ports in each of the plurality of first switch devices and at least one of the plurality of ports in each of the corresponding plurality of second switch devices are interconnected, and
wherein at least one of the plurality of ports in each of the plurality of third switch devices and at least one of the plurality of ports in each of the corresponding plurality of fourth switch devices are interconnected.

13. A method of controlling an inter-switch device connection path in a storage subsystem including a first controller configured to control a plurality of drive units connected via a plurality of first switch devices in cascade connection, and a second controller configured to control the plurality of drive units connected via a plurality of second switch devices in cascade connection and associated with the plurality of first switch devices, the method comprising:
sending, by at least one of the first disk controller and the second disk controller, a data frame based on a command for accessing at least one of the plurality of drive units via the plurality of switch devices connected to itself;
receiving, by the at least one disk controller, the data frame sent via the plurality of switch devices in reply to the command, and checking an error in the received data frame;
sending, by the at least one disk controller, an error information send request to the plurality of switch devices upon detecting an error in the data frame as a result of the check;
receiving, by the at least one disk controller, error information sent in reply to the error information send request;
identifying, by the at least one disk controller, the switch device and port of the switch device in which an error has been detected as a fault site based on the received error information; and
changing, by the at least one disk controller, the inter-switch device connection path based on the identified fault site and according to a prescribed connection path restructuring pattern.

14. The control method according to claim 13,
wherein, at the step of changing the inter-switch connection path, the connection status of at least one of the plurality of first switch devices and at least one of the corresponding plurality of second switch devices is set to an enabled status so as to circumvent the identified fault site.

* * * * *